US009424766B2

(12) United States Patent
Choi

(10) Patent No.: US 9,424,766 B2
(45) Date of Patent: Aug. 23, 2016

(54) METHOD OF DISPLAYING STEREOSCOPIC IMAGES, AND STEREOSCOPIC IMAGE DISPLAY DEVICE

(75) Inventor: Byeong-Hwa Choi, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 924 days.

(21) Appl. No.: 13/452,800

(22) Filed: Apr. 20, 2012

(65) Prior Publication Data

US 2013/0002655 A1    Jan. 3, 2013

(30) Foreign Application Priority Data

Jun. 30, 2011 (KR) .................. 10-2011-0064225

(51) Int. Cl.
G06T 15/00 (2011.01)
G09G 3/00 (2006.01)
H04N 13/04 (2006.01)

(52) U.S. Cl.
CPC .......... *G09G 3/003* (2013.01); *H04N 13/0438* (2013.01); *H04N 13/0497* (2013.01); *G09G 2310/063* (2013.01); *G09G 2320/0209* (2013.01)

(58) Field of Classification Search
CPC .............. H04N 13/0438; H04N 13/0497; G09G 2320/0209; G09G 2310/063; G09G 3/003
USPC ............................................. 345/419; 348/51
See application file for complete search history.

(56) References Cited

U.S. PATENT DOCUMENTS

| 2009/0237495 | A1* | 9/2009 | Kawahara .......... G02B 27/2264 348/56 |
| 2009/0251531 | A1* | 10/2009 | Marshall et al. ................ 348/42 |
| 2011/0012904 | A1* | 1/2011 | Slavenburg et al. .......... 345/501 |
| 2011/0050868 | A1* | 3/2011 | Shigyo et al. .................. 348/56 |
| 2011/0234775 | A1* | 9/2011 | MacNaughton et al. ....... 348/56 |

FOREIGN PATENT DOCUMENTS

| JP | 2003-274431 | 9/2003 |
| KR | 10-1999-0043561 | 6/1999 |
| KR | 10-0248654 | 12/1999 |
| KR | 2000-0019568 | 11/2000 |

* cited by examiner

*Primary Examiner* — Christopher S Kelley
*Assistant Examiner* — Zhihan Zhou
(74) *Attorney, Agent, or Firm* — Lewis Roca Rothgerber Christie LLP

(57) ABSTRACT

A method of displaying stereoscopic images includes synchronizing a first image frame with a first shutter in accordance with a first shutter control signal and synchronizing a second image frame with a second shutter in accordance with a second shutter control signal, adding a first modification voltage to the first and second shutter control signals for a first time period after a start point of a shutter open period, adding a second modification voltage to the first and second shutter control signals for a second time period before an end point of the shutter open period, and alternately opening the first shutter and the second shutter based on the first shutter control signal and the second shutter control signal.

25 Claims, 17 Drawing Sheets

METHOD OF DISPLAYING STEREOSCOPIC IMAGES, AND STEREOSCOPIC IMAGE DISPLAY DEVICE

CROSS-REFERENCE TO RELATED APPLICATION

This application claims priority under 35 USC §119 to Korean Patent Applications No. 10-2011-0064225, filed on Jun. 30, 2011 in the Korean Intellectual Property Office (KIPO), the content of which is incorporated herein in its entirety by reference.

BACKGROUND

1. Field

Aspects of embodiments of the present invention relate generally to an image display device. More particularly, aspects of embodiments of the present invention relate to a stereoscopic image display device.

2. Description of Related Art

A stereoscopic image display device mostly employs binocular parallax techniques to display a stereoscopic image. The binocular parallax techniques may be classified into glasses-based techniques and glasses-free techniques. Recently, a shutter glasses method among the glasses-based techniques is widely used for the stereoscopic image display device that operates based on a left image frame and a right image frame.

According to the shutter glasses method, a stereoscopic image may be displayed by dividing a stereoscopic image frame into a left image frame and a right image frame, and then by sequentially outputting the left image frame by a left shutter and the right image frame by a right shutter. In other words, the left image frame and the right image frame may be provided to a left eye and a right eye, respectively.

However, a delay may occur when each shutter is opened or closed. Thus, an optical interference may occur between the left image frame and the right image frame although the left image frame and the right image frame are synchronized with the left shutter and the right shutter, respectively. As a result, the optical interference may cause a crosstalk problem and/or a contrast degradation problem when the stereoscopic image is displayed.

SUMMARY

Some example embodiments of the present invention are directed toward a method of displaying stereoscopic images, and the method provides for a capability of controlling open/close operations of a left shutter and a right shutter in order to prevent or reduce an optical interference between a first image frame (e.g., a left image frame) and a second image frame (e.g., a right image frame) when a stereoscopic image is displayed.

Some example embodiments of the present invention are directed toward a stereoscopic image display device capable of controlling open/close operations of a left shutter and a right shutter in order to prevent or reduce an optical interference between a first image frame (e.g., a left image frame) and a second image frame (e.g., a right image frame) when a stereoscopic image is displayed.

According to some example embodiments, a method of displaying stereoscopic images includes synchronizing a first image frame with a first shutter in accordance with a first shutter control signal, and synchronizing a second image frame with a second shutter in accordance with a second shutter control signal, the first image frame and the second image frame corresponding to a stereoscopic image frame, adding a first modification voltage to the first shutter control signal and the second shutter control signal for a first time period after a start point of a shutter open period, the shutter open period corresponding to a first voltage, adding a second modification voltage to the first shutter control signal and the second shutter control signal for a second time period before an end point of the shutter open period, and alternately opening the first shutter and the second shutter based on the first shutter control signal and the second shutter control signal when the first image frame and the second image frame are sequentially output.

In example embodiments, the first image frame may correspond to a left image frame, and the second image frame may correspond to a right image frame.

In example embodiments, the first shutter may correspond to a left shutter, and the second shutter may correspond to a right shutter.

In example embodiments, the method of displaying stereoscopic images may further include adding a third modification voltage to the first shutter control signal and the second shutter control signal for a third time period after a start point of a shutter close period, the shutter close period corresponding to a second voltage.

In example embodiments, the first voltage may correspond to a ground voltage, and the second voltage may correspond to a positive voltage or a negative voltage.

In example embodiments, the second voltage may correspond to a ground voltage, and the first voltage may correspond to a positive voltage or a negative voltage.

In example embodiments, a magnitude of the first modification voltage may have a constant value for the first time period, and a magnitude of the second modification voltage may have a constant value for the second time period.

In example embodiments, the magnitude of the first modification voltage may be the same as the magnitude of the second modification voltage.

In example embodiments, the magnitude of the first modification voltage may be different from the magnitude of the second modification voltage.

In example embodiments, a polarity of the first modification voltage may be the same as a polarity of the second modification voltage.

In example embodiments, a polarity of the second voltage may be different from the polarity of the first modification voltage and the polarity of the second modification voltage.

In example embodiments, a magnitude of the third modification voltage may have a constant value for the third time period.

In example embodiments, a magnitude of the third modification voltage may decrease in a step shape for the third time period.

In example embodiments, a magnitude of the third modification voltage may decrease in a curve shape for the third time period.

In example embodiments, a magnitude of the third modification voltage may decrease in a straight line shape for the third time period.

In example embodiments, the first time period may be determined to be the same as the second time period.

In example embodiments, the first time period may be determined to be different from the second time period.

According to some example embodiments, a stereoscopic image display device may include a display unit that receives a stereoscopic image frame, that divides the stereoscopic image frame into a first image frame and a second image frame, and that alternately outputs the first image frame and the second image frame based on a first shutter control signal and a second shutter control signal, a first signal processing unit that adds a first modification voltage to the first shutter control signal and the second shutter control signal for a first time period after a start point of a shutter open period corresponding to a first voltage, and that adds a second modification signal to the first shutter control signal and the second shutter control signal for a second time period before an end point of the shutter open period, and a shutter glasses unit that alternately opens a first shutter and a second shutter based on the first shutter control signal and the second shutter control signal.

In example embodiments, the stereoscopic image display device may further include a second signal processing unit that adds a third modification voltage to the first shutter control signal and the second shutter control signal for a third time period after a start point of a shutter close period corresponding to a second voltage.

In example embodiments, a polarity of the first modification voltage may be the same as a polarity of the second modification voltage.

In example embodiments, a polarity of the second voltage may be different from the polarity of the first modification voltage and the polarity of the second modification voltage.

In example embodiments, a magnitude of the first modification voltage may have a constant value for the first time period, and a magnitude of the second modification voltage may have a constant value for the second time period.

In example embodiments, a magnitude of the third modification voltage may have a constant value for the third time period.

In example embodiments, a magnitude of the third modification voltage may decrease in a step shape for the third time period.

In example embodiments, a magnitude of the third modification voltage may decrease in a curve shape for the third time period.

In example embodiments, a magnitude of the third modification voltage may decrease in a straight line shape for the third time period.

Therefore, a method of displaying stereoscopic images according to example embodiments of the present invention may solve a crosstalk problem and/or a contrast degradation problem by controlling open/close operations of a left shutter and a right shutter in order not to prevent or reduce an optical interference between a first image frame (e.g., a left image frame) and a second image frame (e.g., a right image frame) when a stereoscopic image is displayed.

Likewise, a stereoscopic image display device according to example embodiments may solve a crosstalk problem and/or a contrast degradation problem by controlling open/close operations of a left shutter and a right shutter in order to prevent or reduce an optical interference between a first image frame (e.g., a left image frame) and a second image frame (e.g., a right image frame) when a stereoscopic image is displayed.

BRIEF DESCRIPTION OF THE DRAWINGS

Illustrative, non-limiting example embodiments of the present invention will be more clearly understood from the following detailed description taken in conjunction with the accompanying drawings.

DETAILED DESCRIPTION OF THE EMBODIMENTS

Figure 1:
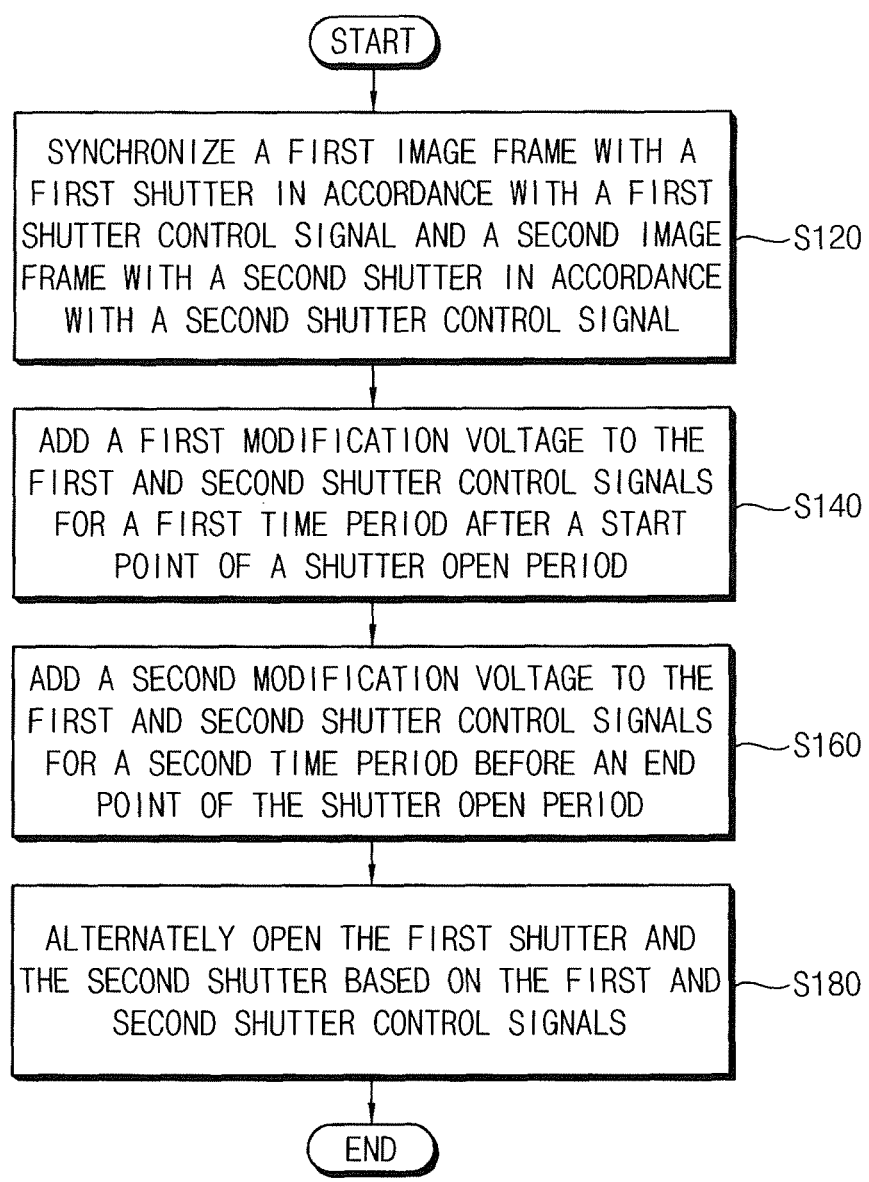
FIG. 1 is a flow chart illustrating a method of displaying stereoscopic images according to example embodiments of the present invention.

Example embodiments will be described more fully hereinafter with reference to the accompanying drawings, in which some example embodiments are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity. Like numerals refer to like elements throughout.

It will be understood that, although the terms first, second, third, etc. may be used herein to describe various elements, these elements should not be limited by these terms. These terms are used to distinguish one element from another. Thus, a first element discussed below may be termed as a second element without departing from the teachings of the present invention. As used herein, the term "and/or" includes any and all combinations of one or more of the associated listed items.

It will be understood that when an element is referred to as being "connected" or "coupled" to another element, it may be directly connected or coupled to the other element or intervening elements may be present. When an element is referred to as being "directly connected" or "directly coupled" to another element, there are no intervening elements present. Other words or terms used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present invention. As used herein, the singular articles "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a flow chart illustrating a method of displaying stereoscopic images according to example embodiments of the present invention.

Referring to FIG. 1, the method of FIG. 1 may include an operation of providing a first shutter control signal for synchronizing a first image frame with a first shutter and a second shutter control signal for synchronizing a second image frame with a second shutter (Step S120), an operation of adding a first modification voltage to the first shutter control signal and the second shutter control signal for a first time period after a start point of a shutter open period corresponding to a first voltage (Step S140), an operation of adding a second modification voltage to the first shutter control signal and the second shutter control signal for a second time period before an end point of the shutter open period (Step S160), and an operation of alternatively opening the first shutter and the second shutter based on the first shutter control signal and the second shutter control signal (Step S180) when the first image frame and the second image frame are sequentially output.

Generally, stereoscopic image display techniques display a stereoscopic image by dividing a stereoscopic image frame into a left image frame and a right image frame, and then by providing the left image frame and the right image frame to a left eye and a right eye, respectively. For example, a shutter glasses method may display the stereoscopic image by dividing the stereoscopic image frame into the left image frame and the right image frame, by sequentially displaying the left image frame on a left shutter and the right image frame on a right shutter, and then by performing open/close operations of the left shutter and the right shutter in synchronization with the left image frame and the right image frame. In more detail, the left shutter may be open and the right shutter may be closed while the left image frame is displayed through the left shutter. On the other hand, the left shutter may be closed and the right shutter may be open while the right image frame is displayed through the right shutter. Generally, a viewer cannot notice a timing difference between these operations because these operations are performed (i.e., repeated) very fast. Thus, the viewer can recognize the stereoscopic image by sequentially watching the left image frame and the right image frame.

In the shutter glasses method, open/close operation of each shutter may be performed based on a shutter control signal. In more detail, each shutter may be open in a shutter open period of the shutter control signal, and may be closed in a shutter close period of the shutter control signal. Here, the shutter open period may correspond to a first voltage (e.g., a ground (GND) voltage), and the shutter close period may correspond to a second voltage (e.g., a positive voltage or a negative voltage) that is different from the first voltage. However, it takes time to open each shutter in the shutter open period of the shutter control signal. Likewise, it also takes time to close each shutter in the shutter close period of the shutter control signal. Hence, a delay may occur when each shutter is opened or closed.

For example, a first shutter control signal may control open/close operations of a first shutter (e.g., a left shutter), and a second shutter control signal may control open/close operations of a second shutter (e.g., a right shutter). As described above, the first shutter and the second shutter alternately operate. In more detail, the first shutter may be closed when the second shutter is opened, and the first shutter may be opened when the second shutter is closed. That is, the shutter open period of the first shutter control signal may correspond to the shutter close period of the second shutter control signal, and the shutter close period of the first shutter control signal may correspond to the shutter open period of the second shutter control signal. In a shutter open period of a shutter control signal (i.e., the first shutter control signal or the second shutter control signal), light may pass through each shutter. In a shutter close period of the shutter control signal, light may not pass through each shutter. However, in the case that a delay occurs as each shutter (i.e., the first shutter or the second shutter) performs open/close operations, an optical interference (e.g. overlapping) between the first image frame and the second image frame may occur near a boundary between the shutter open period and the shutter close period. Here, an optical interference between the first image frame and the second image frame may cause a crosstalk problem or a contrast degradation problem.

To solve this problem, the method of FIG. 1 may modify the first shutter control signal and the second shutter control signal in order to prevent or reduce an optical interference between the first image frame and the second image frame. In more detail, the method of FIG. 1 may provide the first shutter control signal for synchronizing the first image frame with the first shutter and the second shutter control signal for synchronizing the second image frame with the second shutter (Step S120). Generally, a stereoscopic image signal includes a plurality of stereoscopic image frames, and each of the stereoscopic image frames is divided into the first image frame and the second image frame. According to some example embodiments of the present invention, the stereoscopic image signal may be input via a high definition multimedia interface (HDMI). In one example embodiment, the first image frame may correspond to a left image frame, and the second image frame may correspond to a right image frame. The first image frame may include a first active period corresponding to first image data (e.g., left image data), and a first vertical blank for displaying the first image data. The second image frame may include a second active period corresponding to second image data (e.g., right image data), and a second vertical blank for displaying the second image data.

After the stereoscopic image frame is divided into the first image frame and the second image frame, the first image frame and the second image frame may be synchronized with the first shutter and the second shutter based on the first shutter control signal and the second shutter control signal, respectively. In one example embodiment, the first shutter may correspond to a left shutter of a pair of shutter glasses, and the second shutter may correspond to a right shutter of the pair of shutter glasses. In more detail, the first shutter control signal may control open/close operations of the first shutter. For example, the first shutter control signal may control the first shutter to be open while the first image frame is output, and may control the first shutter to be closed while the second image frame is output. Likewise, the second shutter control signal may control open/close operations of the second shutter. For example, the second shutter control signal may control the second shutter to be closed while the first image frame is output, and may control the second shutter to be open while the second image frame is output. As described above, a delay occurs when each shutter is opened or closed. Therefore, an optical interference between the first image frame and the second image frame may occur near a boundary between the shutter open period and the shutter close period of the first and second shutter control signals.

The method of FIG. 1 may add the first modification voltage to the first and second shutter control signals for the first time period after a start point of the shutter open period corresponding to the first voltage (Step S140), and may add the second modification voltage to the first and second shutter control signals for the second time period before an end point of the shutter open period (Step S160). In one example embodiment, the first voltage may be a ground (GND) voltage, and the second voltage may be a positive voltage or a negative voltage. In this case, the first shutter may be open when the first shutter control signal has a ground (GND) voltage, and may be closed when the first shutter control signal has a positive voltage or a negative voltage. Likewise, the second shutter may be open when the second shutter control signal has a ground (GND) voltage, and may be closed when the second shutter control signal has a positive voltage or a negative voltage. In another example embodiment, the first voltage may be a positive voltage or a negative voltage, and the second voltage may be a ground (GND) voltage. In this case, the first shutter may be open when the first shutter control signal has a positive voltage or a negative voltage, and may be closed when the first shutter control signal has a ground (GND) voltage. Likewise, the second shutter may be open when the second shutter control signal has a positive voltage or a negative voltage, and may be closed when the second shutter control signal has a ground (GND) voltage. Thus, open/close operations of the first shutter may be contrary to open/close operations of the second shutter because the first shutter control signal is contrary to the second shutter control signal. For example, the first shutter control signal and the second shutter control signal are opposite signals.

In example embodiments, a magnitude of the first modification voltage has a constant value for the first time period, and a magnitude of the second modification voltage has a constant value for the second time period. For example, the first modification voltage and the second modification voltage may be provided in a square-wave shape. Hence, the shutter open period corresponding to the first voltage in the first and second shutter control signals may be substantially narrowed (or reduced) by the first modification voltage and the second modification voltage. In addition, a magnitude of the first modification voltage and a magnitude of the second modification voltage may be determined within a range where an optical interference between the first image frame and the second image frame does not occur. In one example embodiment, a magnitude of the first modification voltage may be the same as a magnitude of the second modification voltage. In another example embodiment, a magnitude of the first modification voltage may be different from a magnitude of the second modification voltage. Further, the first time period and the second time period may be determined within a range where an optical interference between the first image frame and the second image frame does not occur. In one example embodiment, the first time period may be the same as the second time period. In another example embodiment, the first time period may be different from the second time period. For example, if characteristics of timings where the first and second shutter control signals are changed from the shutter open period to the shutter close period are different from characteristics of timings where the first and second shutter control signals are changed from the shutter close period to the shutter open period, a magnitude of the first modification voltage may be determined to be different from a magnitude of the second modification voltage, and the first time period may be determined to be different from the second time period.

In example embodiments, a polarity of the first modification voltage may be the same as a polarity of the second modification voltage, and a polarity of the second voltage may be different from a polarity of the first modification voltage and a polarity of the second modification voltage. Here, the second voltage may correspond to the shutter close period of the first and second shutter control signals. For example, the first modification voltage and the second modification voltage may be negative voltages when the first voltage corresponding to the shutter open period is a ground (GND) voltage and the second voltage corresponding to the shutter close period is a positive voltage. In an embodiment, the first modification voltage and the second modification voltage may be positive voltages when the first voltage corresponding to the shutter open period is a ground (GND) voltage and the second voltage corresponding to the shutter close period is a negative voltage. Thus, the method of FIG. 1 may modify the first shutter control signal and the second shutter control signal by adding the first modification voltage to the first and second shutter control signals for the first time period after a start point of the shutter open period, and by adding the second modification voltage to the first and second shutter control signals for the second time period before an end point of the shutter open period. As a result, an optical interference between the first image frame and the second image frame may be prevented or reduced because a rising time and a falling time between the shutter open period and the shutter close period decreases in the first shutter control signal and the second shutter control signal, respectively.

Then, the method of FIG. 1 may alternately open the first shutter and the second shutter based on the first shutter control signal and the second shutter control signal (Step S180) when the first image frame and the second image frame are sequentially output. As described above, the first shutter (e.g., a left shutter) may be open, and the second shutter (e.g., a right shutter) may be closed while the first image frame (e.g., a left image frame) is output. On the other hand, the first shutter may be closed and the second shutter may be open while the second image frame (e.g., a right image frame) is output. For this operation, the shutter open period of the first shutter control signal may be adjusted for the first image frame to be output in the shutter open period of the first shutter control signal, and the shutter close period of the first shutter control signal may be adjusted for the second image frame to be output in the shutter close period of the first shutter control signal. Likewise, the shutter open period of the second shutter control signal may be adjusted for the second image frame to be output in the shutter open period of the second shutter control signal, and the shutter close period of the second shutter control signal may be adjusted for the first image frame to be output in the shutter close period of the second shutter control signal. Thus, open/close operations of the first shutter may be contrary to open/close operations of the second shutter because the first shutter control signal is contrary to the second shutter control signal.

The method of FIG. 1 may modify the first shutter control signal for synchronizing the first image frame with the first shutter and the second shutter control signal for synchronizing the second image frame with the second shutter by adding the first modification voltage to the first and second shutter control signals for the first time period after a start point of the shutter open period, and by adding the second modification voltage to the first and second shutter control signals for the second time period before an end point of the shutter open period. Therefore, an optical interference (e.g., overlapping) between the first image frame and the second image frame may be prevented or reduced by controlling open/close operations of the first shutter and the second shutter. As a result, the method of FIG. 1 may provide a high-quality stereoscopic image to a viewer by solving a crosstalk problem and/or a contrast degradation problem due to the optical interference. According to some example embodiments, the method of FIG. 1 may be implemented by a hardware system, a software system, or a combination thereof.

Figure 2:
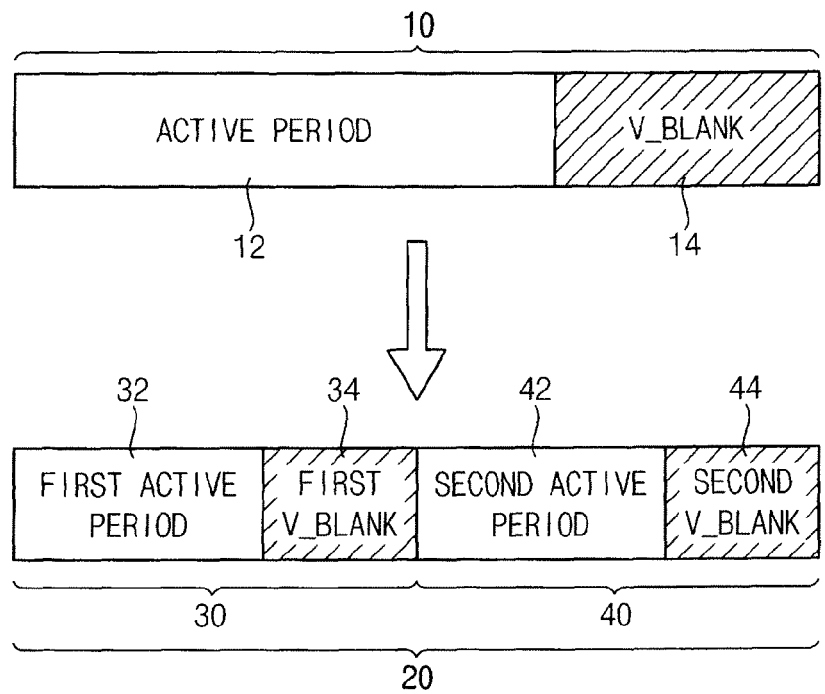
FIG. 2 is a diagram illustrating a conversion image frame having a first image frame and a second image frame that are generated from a stereoscopic image frame.

FIG. 2 is a diagram illustrating a conversion image frame having a first image frame and a second image frame that are generated from a stereoscopic image frame.

Referring to FIG. 2, the stereoscopic image frame 10 may be converted into the conversion image frame 20. That is, the stereoscopic image frame 10 may be divided into the first image frame 30 and the second image frame 40. A stereoscopic image signal (e.g., Side by Side, Top & Bottom, Double Frame, etc) may include a plurality of stereoscopic image frames 10. Here, each stereoscopic image frame 10 may be divided into the first image frame 30 and the second image frame 40. For example, the stereoscopic image frame 10 of 60 Hz may be divided into the first image frame 30 of 120 Hz (e.g., a left image frame) and the second image frame 40 of 120 Hz (e.g., a right image frame). The stereoscopic image frame 10 may include an active period 12 corresponding to stereoscopic image data, and a vertical blank 14 for displaying the stereoscopic image data. The first image frame 30 may include a first active period 32 corresponding to first image data, and a first vertical blank 34 for displaying the first image data. The second image frame 40 may include a second active period 42 corresponding to second image data, and a second vertical blank 44 for displaying the second image data.

As described above, while the first image frame 30 is output, the first shutter may be open, and the second shutter may be close. In this case, the first shutter control signal may have the first voltage corresponding to the shutter open period, and the second shutter control signal may have the second voltage corresponding to the shutter close period when the first image frame 30 is output. On the other hand, while the second image frame 40 is output, the first shutter may be close, and the second shutter may be open. In this case, the first shutter control signal may have the second voltage corresponding to the shutter close period, and the second shutter control signal may have the first voltage corresponding to the shutter open period when the second image frame 40 is output. Here, the method of FIG. 1 modifies the first and second shutter control signals by adding the first modification voltage to the first and second shutter control signals for the first time period after a start point of the shutter open period, and by adding the second modification voltage to the first and second shutter control signals for the second time period before an end point of the shutter open period. As a result, a rising time and a falling time between the shutter open period and the shutter close period may decrease in the first shutter control signal and the second shutter control signal. Hence, an optical interference between the first image frame 30 and the second image frame 40 may be prevented or reduced when a stereoscopic image is displayed.

Figure 3:
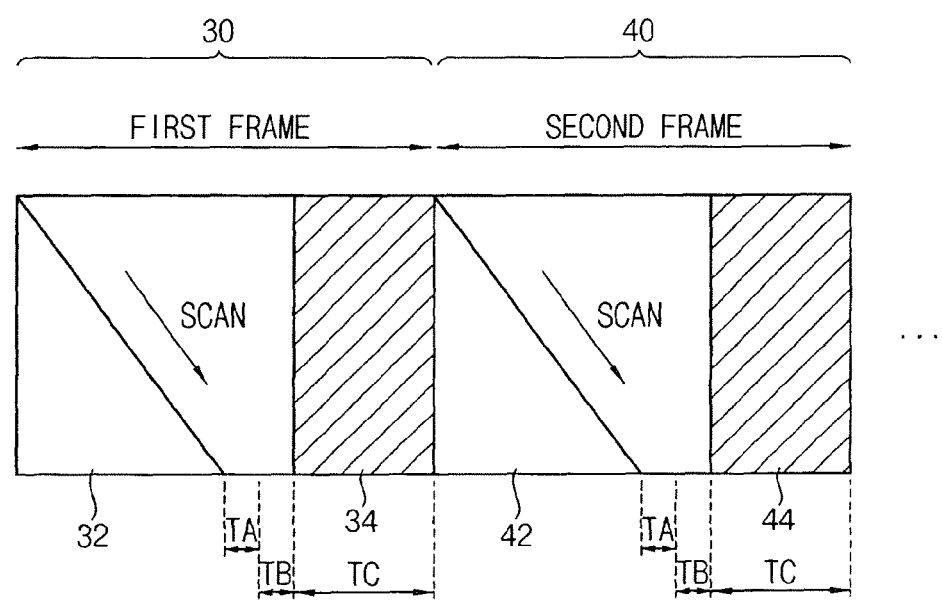
FIG. 3 is a diagram illustrating an embodiment in which a first image frame and a second image frame are sequentially output.

FIG. 3 is a diagram illustrating an embodiment in which a first image frame and a second image frame that are sequentially output.

Referring to FIG. 3, the first image frame 30 and the second image frame 40 may be sequentially output after the stereoscopic image frame 10 is divided into the first image frame 30 and the second image frame 40. In one example embodiment, the first image frame 30 may correspond to a left image frame, and the second image frame 40 may correspond to a right image frame. In FIG. 3, TA denotes a liquid crystal response region, TB denotes a shutter response region, and TC denotes a shutter open region. In more detail, in the first image frame 30, as a scan signal SCAN for providing first image data is applied, the first shutter may be opened after all cells are charged with the first image data. Here, in the second image frame 40 following the first image frame 30, the first shutter may be closed before a scan signal SCAN for providing second image data is applied. Then, in the second image frame 40 following the first image frame 30, as a scan signal SCAN for providing second image data is applied, the second shutter may be opened after all cells are charged with the second image data. Here, in another one of the first image frame 30 following the second image frame 40, the second shutter may be closed before a scan signal SCAN for providing first image data is applied. While these operations are repeated, the method of FIG. 1 modifies the first and second shutter control signals by adding the first modification voltage to the first and second shutter control signals for the first time period after a start point of the shutter open period, and by adding the second modification voltage to the first and second shutter control signals for the second time period before an end point of the shutter open period. As a result, a rising time and a falling time between the shutter open period and the shutter close period may decrease in the first shutter control signal and the second shutter control signal. Hence, an optical interference between the first image frame 30 and the second image frame 40 may be prevented or reduced when a stereoscopic image is displayed. Therefore, a high-quality stereoscopic image may be provided to a viewer by solving a crosstalk problem or a contrast degradation problem due to the optical interference.

Figure 4:
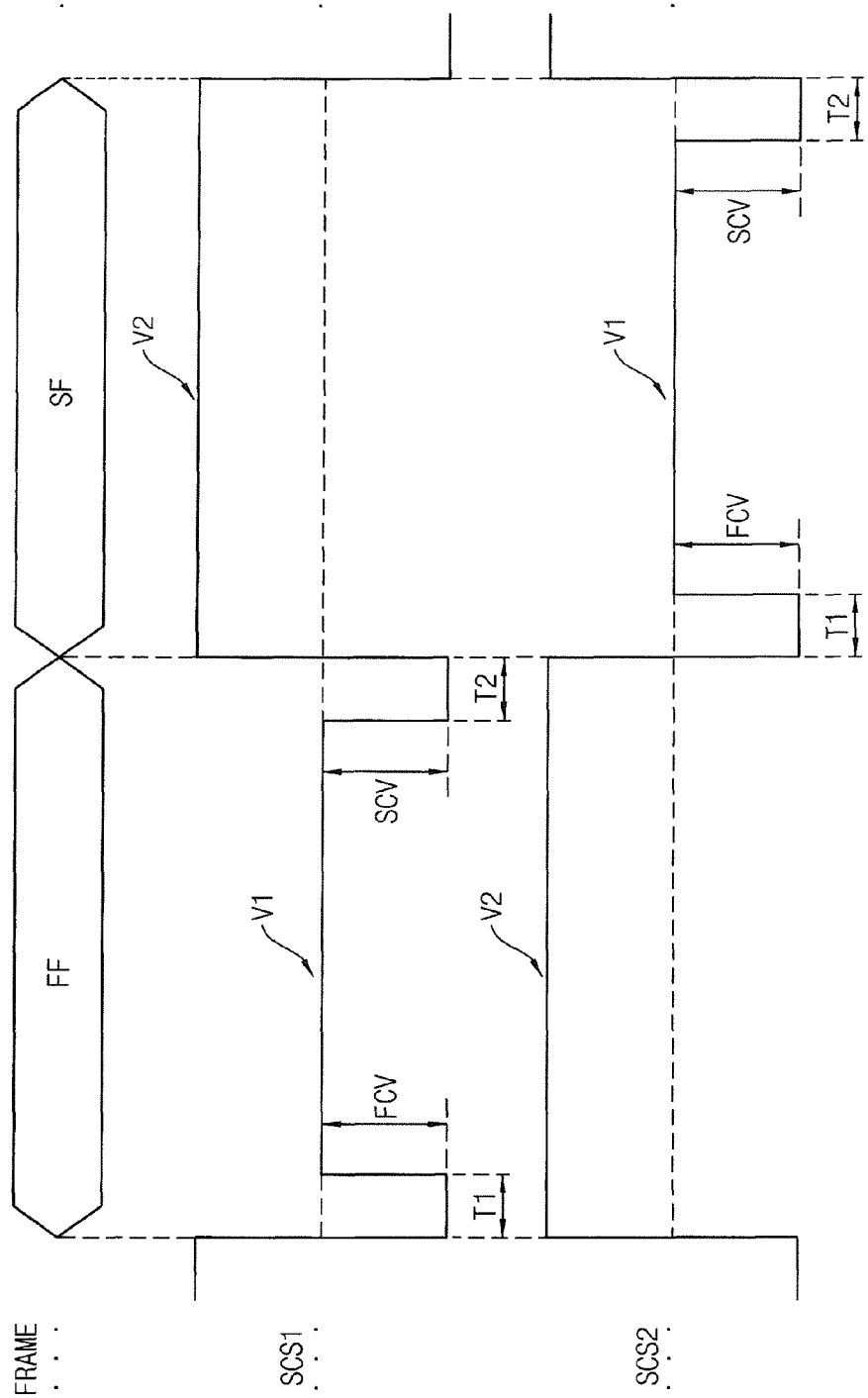
FIG. 4 is a timing diagram illustrating an embodiment in which a first shutter control signal and a second shutter control signal are modified by the method of FIG. 1.

FIG. 4 is a timing diagram illustrating an embodiment in which a first shutter control signal and a second shutter control signal are modified by the method of FIG. 1.

Referring to FIG. 4, the method of FIG. 1 adds the first modification voltage FCV to the first and second shutter control signals SCS1 and SCS2 for the first time period T1 after a start point of the shutter open period corresponding to the first voltage V1, and adds the second modification voltage SCV to the first and second shutter control signals SCS1 and SCS2 for the second time period T2 before an end point of the shutter open period corresponding to the first voltage V1. As illustrated in FIG. 4, a magnitude of the first modification voltage FCV may have a constant value for the first time period T1, and a magnitude of the second modification voltage SCV may have a constant value for the second time period T2. In other words, the first modification voltage FCV and the second modification voltage SCV may be provided in a square-wave shape. As a result, the shutter open period corresponding to the first voltage V1 of the first and second shutter control signals SCS1 and SCS2 may be substantially narrowed by the first and second modification voltages FCV and SCV. In one example embodiment, the first voltage V1 may be a ground (GND) voltage, and the second voltage V2 may be a positive voltage. Thus, the first and second modification voltages FCV and SCV may be negative voltages.

In addition, the first time period T1 and the second time period T2 may be adjusted within a suitable range where an optical interference between the first image frame FF and the second image frame SF is not caused or reduced. Although it is illustrated in FIG. 4 that the first time period T1 is substantially the same as the second time period T2, the first time period T1 may be different from the second time period T2 according to the conditions of various systems. Furthermore, a magnitude of the first modification voltage FCV and a magnitude of the second modification voltage SCV may be adjusted within a suitable range where an optical interference between the first image frame FF and the second image frame SF is not caused or reduced. Although it is illustrated in FIG. 4 that a magnitude of the first modification voltage FCV is substantially the same as a magnitude of the second modification voltage SCV, a magnitude of the first modification voltage FCV may be different from a magnitude of the second modification voltage SCV according to the conditions of various systems. For example, if characteristics of timings where the first and second shutter control signals SCS1 and SCS2 are changed from the shutter open period to the shutter close period are different from characteristics of timings where the first and second shutter control signals SCS1 and SCS2 are changed from the shutter close period to the shutter open period, a magnitude of the first modification voltage FCV may be determined to be different from a magnitude of the second modification voltage SCV, and the first time period T1 may be determined to be different from the second time period T2. Therefore, a characteristic difference between both timings may be compensated for.

As described above, the first shutter may be open and the second shutter may be closed while the first image frame FF is output. For this operation, the first shutter control signal SCS1 may have the first voltage V1 corresponding the shutter open period, and the second shutter control signal SCS2 may have the second voltage V2 corresponding to the shutter close period. On the other hand, the first shutter may be closed and the second shutter may be open while the second image frame SF is output. For this operation, the first shutter control signal SCS1 may have the second voltage V2 corresponding the shutter close period, and the second shutter control signal SCS2 may have the first voltage V1 corresponding to the shutter open period. That is, open/close operations of the first shutter may be contrary to open/close operations of the second shutter because the first shutter control signal SCS1 is contrary to (e.g., opposite) the second shutter control signal SCS2. Generally, a delay occurs when each shutter is opened or closed. Thus, an optical interference between the first image frame FF and the second image frame SF may occur near a boundary between the shutter open period and the shutter close period of the first and second shutter control signals SCS1 and SCS2. To solve this problem, as described above, the method of FIG. 1 may prevent or reduce an optical interference between the first image frame FF and the second image frame SF by adding the first modification voltage FCV to the first and second shutter control signals SCS1 and SCS2 for the first time period T1 after a start point of the shutter open period, and by adding the second modification voltage SCV to the first and second shutter control signals SCS1 and SCS2 for the second time period T2 before an end point of the shutter open period.

Figure 5:
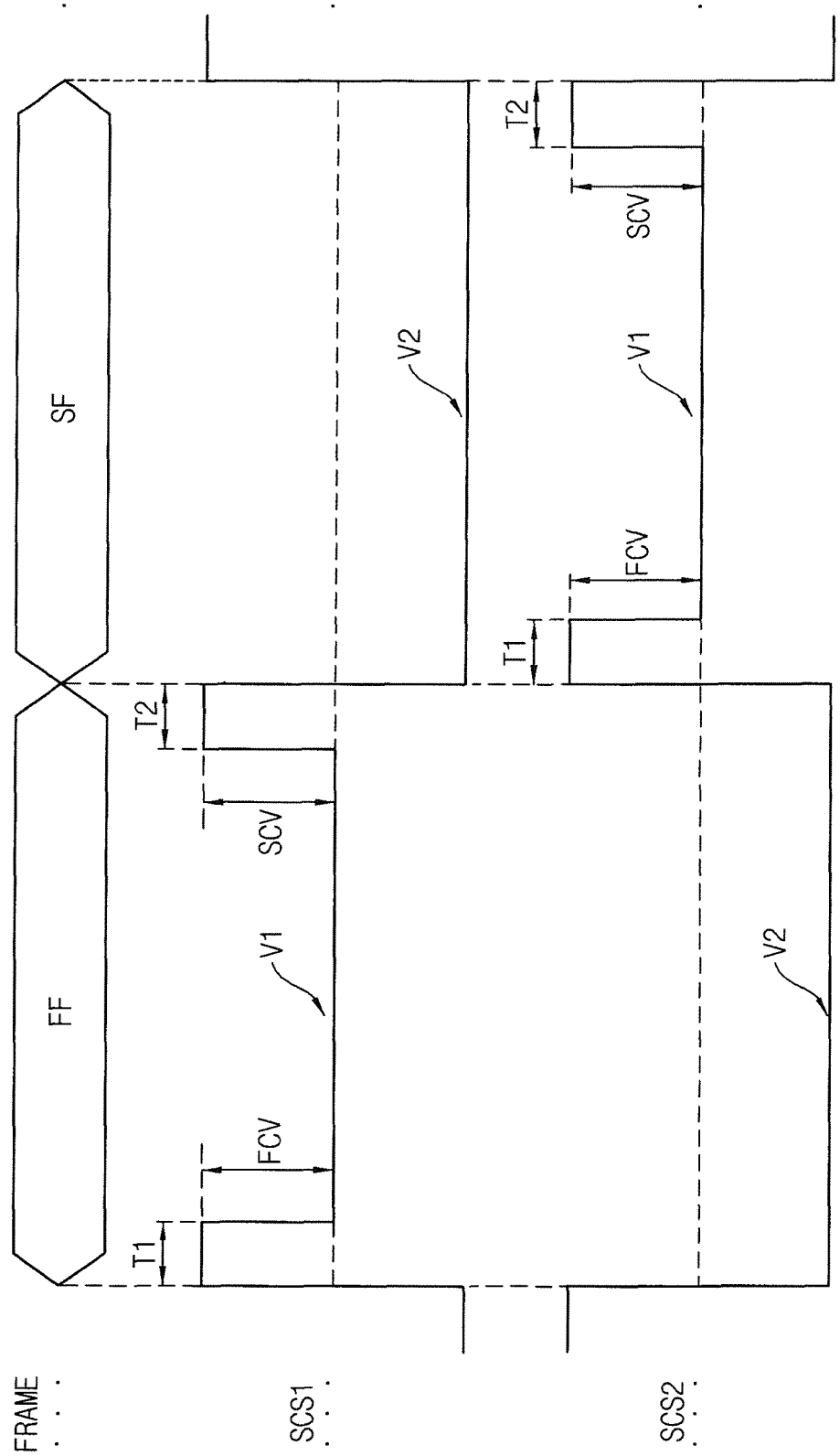
FIG. 5 is a timing diagram illustrating another embodiment in which a first shutter control signal and a second shutter control signal are modified by the method of FIG. 1.

FIG. 5 is a timing diagram illustrating another embodiment in which a first shutter control signal and a second shutter control signal are modified by the method of FIG. 1.

Referring to FIG. 5, the method of FIG. 1 may add the first modification voltage FCV to the first and second shutter control signals SCS1 and SCS2 for the first time period T1 after a start point of the shutter open period corresponding to the first voltage V1, and may add the second modification voltage SCV to the first and second shutter control signals SCS1 and SCS2 for the second time period T2 before an end point of the shutter open period corresponding to the first voltage V1. As illustrated in FIG. 5, a magnitude of the first modification voltage FCV may have a constant value for the first time period T1, and a magnitude of the second modification voltage SCV may have a constant value for the second time period T2. In other words, the first modification voltage FCV and the second modification voltage SCV may be provided in a square-wave shape. As a result, the shutter open period corresponding to the first voltage V1 of the first and second shutter control signals SCS1 and SCS2 may be substantially narrowed by the first modification voltage FCV and the second modification voltage SCV. In one example embodiment, the first voltage V1 may be a ground (GND) voltage, and the second voltage V2 may be a negative voltage. Thus, the first and second modification voltages FCV and SCV may be positive voltages.

In addition, the first time period T1 and the second time period T2 may be adjusted within a suitable range where an optical interference between the first image frame FF and the second image frame SF is prevented or reduced. Although it is illustrated in FIG. 5 that the first time period T1 is substantially the same as the second time period T2, the first time period T1 may be different from the second time period T2 according to the conditions of various systems. Furthermore, a magnitude of the first modification voltage FCV and a magnitude of the second modification voltage SCV may be adjusted within a suitable range where an optical interference between the first image frame FF and the second image frame SF is prevented or reduced. Although it is illustrated in FIG. 5 that a magnitude of the first modification voltage FCV is substantially the same as a magnitude of the second modification voltage SCV, a magnitude of the first modification voltage FCV may be different from a magnitude of the second modification voltage SCV according to the conditions of various systems. For example, if characteristics of timings where the first and second shutter control signals SCS1 and SCS2 are changed from the shutter open period to the shutter close period are different from characteristics of timings where the first and second shutter control signals SCS1 and SCS2 are changed from the shutter close period to the shutter open period, a magnitude of the first modification voltage FCV may be determined to be different from a magnitude of the second modification voltage SCV, and the first time period T1 may be determined to be different from the second time period T2. As described above, the method of FIG. 1 may prevent or reduce an optical interference between the first image frame FF and the second image frame SF by adding the first modification voltage FCV to the first and second shutter control signals SCS1 and SCS2 for the first time period T1 after a start point of the shutter open period, and by adding the second modification voltage SCV to the first and second shutter control signals SCS1 and SCS2 for the second time period T2 before an end point of the shutter open period.

Figure 6:
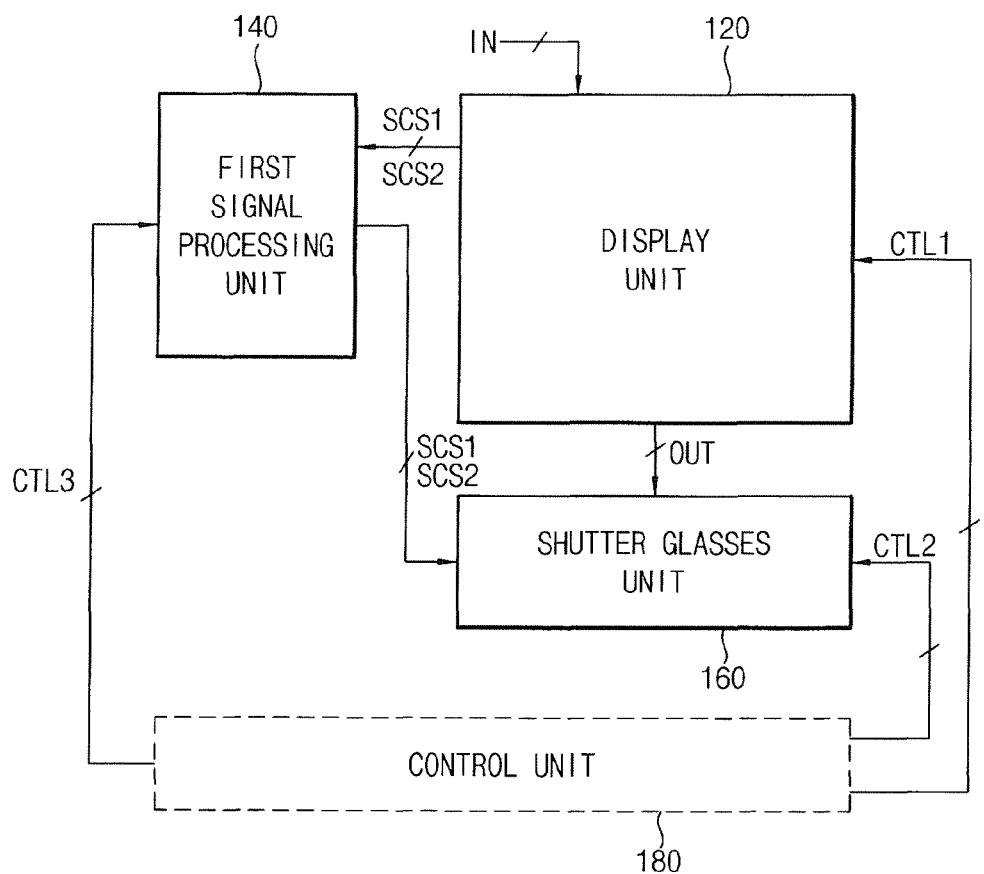
FIG. 6 is a block diagram illustrating a stereoscopic image display device according to example embodiments of the present invention.

FIG. 6 is a block diagram illustrating a stereoscopic image display device 100 according to example embodiments.

Referring to FIG. 6, the stereoscopic image display device 100 may include a display unit 120, a first signal processing unit 140, and a shutter glasses unit 160. In example embodiments, the stereoscopic image display device 100 may further include a control unit 180 that controls the display unit 120, the first signal processing unit 140, and the shutter glasses unit 160.

The display unit 120 may receive a stereoscopic image frame (i.e., IN), may divide the stereoscopic image frame into a first image frame and a second image frame, and may alternately output the first image frame and the second image frame (i.e., OUT) based on a first shutter control signal SCS1 and a second shutter control signal SCS2. According to some example embodiments, the display unit 120 may operate based on a first control signal CTL1 output from the control unit 180. Although it is illustrated in FIG. 6 that the control unit 180 is placed outside the display unit 120, the control unit 180 may be placed within the display unit 120 according to the conditions of various systems. In one example embodiment, the display unit 120 may include a frame converter that divides the stereoscopic image frame into the first image frame and the second image frame, a display panel that alternately outputs the first image frame and the second image frame, and a display driver that drives the display panel. Components of the display unit 120 will be described below with reference to FIG. 7. The display unit 120 may include a back-light unit when the display panel is a liquid crystal display (LCD) panel. The display unit 120 may not include a back-light unit when the display panel is an organic light emitting diodes (OLED) panel.

The first signal processing unit 140 may add a first modification voltage to the first and second shutter control signals SCS1 and SCS2 for a first time period after a start point of a shutter open period corresponding to a first voltage, and may add a second modification voltage to the first and second shutter control signals SCS1 and SCS2 for a second time period before an end point of the shutter open period. That is, the first signal processing unit 140 may modify the first and second shutter control signals SCS1 and SCS2 to prevent or reduce an optical interference between the first image frame and the second image frame, and may provide the first shutter control signal SCS1 and the second shutter control signal SCS2 to the shutter glasses unit 160. According to some example embodiments, the first signal processing unit 140 may operate based on a third control signal CTL3 output from the control unit 180. In one example embodiment, the first signal processing unit 140 may include a shutter control signal input unit that receives the first shutter control signal SCS1 and the second shutter control signal SCS2, a shutter control signal modification unit that modifies the first shutter control signal SCS1 and the second shutter control signal SCS2 to prevent or reduce an optical interference between the first image frame and the second image frame, and a shutter control signal output unit that outputs the first shutter control signal SCS1 and the second shutter control signal SCS2 to the shutter glasses unit 160. Components of the first signal processing unit 140 will be described below with reference to FIG. 8.

When the first signal processing unit 140 modifies the first and second shutter control signals SCS1 and SCS2, a magnitude of the first modification voltage may have a constant value for the first time period, and a magnitude of the second modification voltage may have a constant value for the second time period. In other words, the first modification voltage and the second modification voltage may be provided in a square-wave shape. As a result, the shutter open period corresponding to the first voltage of the first and second shutter control signals SCS1 and SCS2 may be substantially narrowed by the first modification voltage and the second modification voltage. In one example embodiment, the first voltage may be a ground (GND) voltage, and the second voltage may be a positive voltage or a negative voltage. In another example embodiment, the first voltage may be a positive voltage or a negative voltage, and the second voltage may be a ground (GND) voltage. Here, a polarity of the first modification voltage may be the same as a polarity of the second modification voltage, and a polarity of the second voltage corresponding to the shutter close period may be different from a polarity of the first modification voltage and a polarity of the second modification voltage. In addition, a magnitude of the first modification voltage may be the same as a magnitude of the second modification voltage, or a magnitude of the first modification voltage may be different from a magnitude of the second modification voltage. Furthermore, the first time period may be the same as the second time period, or the first time period may be different from the second time period.

The shutter glasses unit 160 may alternately open the first shutter and the second shutter based on the first shutter control signal SCS1 and the second shutter control signal SCS2, respectively. For example, the first and second shutter control signals SCS1 and SCS2 may be provided to the shutter glasses unit 160 by various wire/wireless techniques. According to some example embodiments, the shutter glasses unit 160 may operate based on a second control signal CTL2 output from the control unit 180. In one example embodiment, the shutter glasses unit 160 may include a first shutter, a second shutter, and a shutter driving unit that drives the first shutter and the second shutter. Components of the shutter glasses unit 160 are described below with respect to FIG. 9. For example, the first and second shutters may be liquid crystal shutters. The shutter glasses unit 160 may open the first shutter, and may close the second shutter while the first image frame is output from the display unit 120. That is, the first shutter control signal SCS1 may have the first voltage corresponding to the shutter open period, and the second shutter control signal SCS2 may have the second voltage corresponding to the shutter close period while the first image frame is output from the display unit 120. On the other hand, the shutter glasses unit 160 may open the second shutter, and may close the first shutter while the second image frame is output from the display unit 120. That is, the first shutter control signal SCS1 may have the second voltage corresponding to the shutter close period, and the second shutter control signal SCS2 may have the first voltage corresponding to the shutter open period while the second image frame is output from the display unit 120. Thus, open/close operations of the first shutter may be contrary to open/close operations of the second shutter because the first shutter control signal SCS1 is contrary to the second shutter control signal SCS2.

As described above, the stereoscopic image display device 100 may modify the first shutter control signal SCS1 for synchronizing the first image frame with the first shutter and the second shutter control signal SCS2 for synchronizing the second image frame with the second shutter by adding the first modification voltage to the first and second shutter control signals SCS1 and SCS2 for the first time period after a start point of the shutter open period, and by adding the second modification voltage to the first and second shutter control signals SCS1 and SCS2 for the second time period before an end point of the shutter open period. Thus, an optical interference (e.g., overlapping) between the first image frame (e.g., a left image frame) and the second image frame (e.g., a right image frame) may be prevented or reduced by controlling open/close operations of the first shutter (e.g., a left shutter) and the second shutter (e.g., a right shutter) of the shutter glasses unit 160. That is, an optical interference between the first image frame and the second image frame may be prevented or reduced because a rising time and a falling time between the shutter open period and the shutter close period of the first and second shutter control signals SCS1 and SCS2 are reduced. As a result, the stereoscopic image display device 100 may provide a high-quality stereoscopic image to a viewer by solving a crosstalk problem or a contrast degradation problem due to the optical interference.

Figure 7:
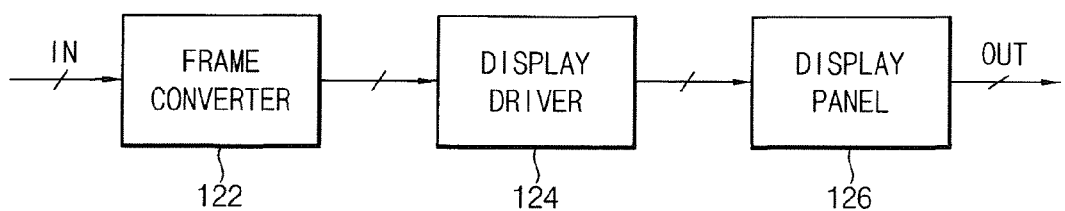
FIG. 7 is a block diagram illustrating a display unit in the stereoscopic image display device of FIG. 6.

FIG. 7 is a block diagram illustrating a display unit in the stereoscopic image display device of FIG. 6.

Referring to FIG. 7, the display unit 120 may include a frame converter 122, a display driver 124, and a display panel 126.

The frame converter 122 may receive a stereoscopic image signal (i.e., IN) having a plurality of stereoscopic image frames, and may convert each stereoscopic image frame into the first image frame and the second image frame. In one example embodiment, the first image frame may correspond to a left image frame, and the second image frame may correspond to a right image frame. The display driver 124 may control the first image frame and the second image frame to be alternately displayed on the display panel 126. In one example embodiment, the display driver 124 may include a data driver for driving data lines of the display panel 126, a gate driver for driving gate lines of the display panel 126, a timing controller for controlling timings of the drivers, etc. The display driver 124 may further include a shutter control unit for controlling open/close operations of the first shutter and the second shutter of the shutter glasses unit 160. According to some example embodiments, the control unit 180 may also perform functions of the shutter control unit. The display panel 126 may alternately output the first image frame and the second image frame (i.e., OUT) under controls of the display driver 124. In one example embodiment, the display panel 126 may be an LCD panel. In this case, the display unit 120 may include a back-light unit. In another example embodiment, the display panel 126 may be an OLED panel. In this case, the display unit 120 may not include a back-light unit.

Figure 8:
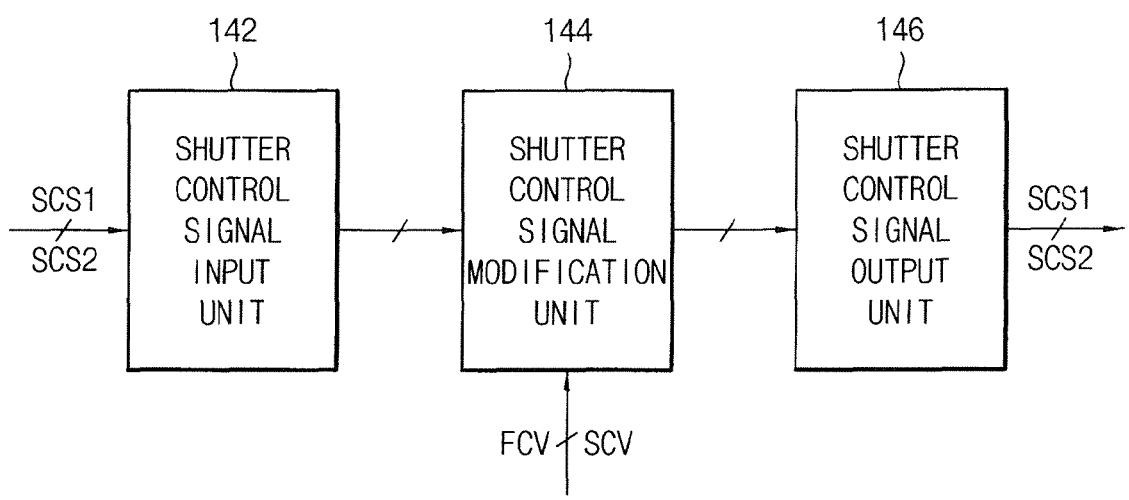
FIG. 8 is a block diagram illustrating a first signal processing unit in the stereoscopic image display device of FIG. 6.

FIG. 8 is a block diagram illustrating a first signal processing unit 140 in the stereoscopic image display device of FIG. 6.

Referring to FIG. 8, the first signal processing unit 140 may include a shutter control signal input unit 142, a shutter control signal modification unit 144, and a shutter control signal output unit 146.

The shutter control signal input unit 142 may receive the first shutter control signal SCS1 and the second shutter control signal SCS2. As described above, the first shutter control signal SCS1 may control open/close operations of the first shutter (e.g., a left shutter), and the second shutter control signal SCS2 may control open/close operations of the second shutter (e.g., a right shutter). Here, open/close operations of the first shutter may be contrary to open/close operations of the second shutter because the first shutter control signal SCS1 is contrary to the second shutter control signal SCS2. For example, when the first shutter control signal SCS1 has the first voltage corresponding to the shutter open period, the second shutter control signal SCS2 may have the second voltage corresponding to the shutter close period. On the other hand, when the first shutter control signal SCS1 has the second voltage corresponding to the shutter close period, the second shutter control signal SCS2 may have the first voltage corresponding to the shutter open period. The shutter control signal modification unit 144 may add the first modification voltage FCV to the first and second shutter control signals SCS1 and SCS2 for the first time period after a start point of the shutter open period, and may add the second modification voltage SCV to the first and second shutter control signals SCS1 and SCS2 for the second time period before an end point of the shutter open period. Here, a magnitude of the first modification voltage FCV may have a constant value for the first time period, and a magnitude of the second modification voltage SCV may have a constant value for the second time period. In other words, the first and second modification voltages FCV and SCV may be provided in a square-wave shape. In one example embodiment, the first voltage may correspond to a ground (GND) voltage, and the second voltage may correspond to a positive voltage or a negative voltage. In another example embodiment, the first voltage may correspond to a positive voltage or a negative voltage, and the second voltage may be a ground (GND) voltage. Here, a polarity of the first modification voltage FCV may be the same as a polarity of the second modification voltage SCV, and a polarity of the second voltage corresponding to the shutter close period may be different from a polarity of the first modification voltage FCV and a polarity of the second modification voltage SCV. In addition, a magnitude of the first modification voltage FCV may be the same as a magnitude of the second modification voltage SCV, or a magnitude of the first modification voltage FCV may be different from a magnitude of the second modification voltage SCV. Furthermore, the first time period may be the same as the second time period, or the first time period may be different from the second time period. Then, the shutter control signal output unit 146 may provide the first and second shutter control signals SCS1 and SCS2 to the shutter glasses unit 160.

Figure 9:
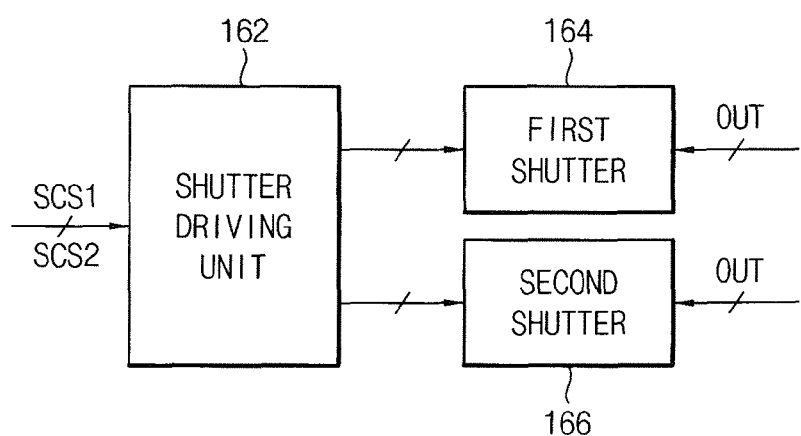
FIG. 9 is a block diagram illustrating a shutter glasses unit in the stereoscopic image display device of FIG. 6.

FIG. 9 is a block diagram illustrating a shutter glasses unit in the stereoscopic image display device of FIG. 6.

Referring to FIG. 9, the shutter glasses unit 160 may include a shutter driving unit 162, a first shutter 164, and a second shutter 166.

The shutter driving unit 162 may drive the first shutter 164 based on the first shutter control signal SCS1 output from the first signal processing unit 140, and may drive the second shutter 166 based on the second shutter control signal SCS2 output from the first signal processing unit 140. That is, the first shutter control signal SCS1 may control open/close operations of the first shutter 164, and the second shutter control signal SCS2 may control open/close operations of the second shutter 166. Here, open/close operations of the first shutter 164 may be contrary to open/close operations of the second shutter 166. In other words, the second shutter 166 may be closed when the first shutter 164 is open, and the second shutter 166 may be open when the first shutter 166 is close. For this operation, the first shutter control signal SCS1 may be contrary to the second shutter control signal SCS2. For example, the shutter open period of the first shutter control signal SCS1 may be overlapped with the shutter close period of the second shutter control signal SCS2. Likewise, the shutter close period of the first shutter control signal SCS1 may be overlapped with the shutter open period of the second shutter control signal SCS2. As described above, the first and second shutter control signals SCS1 and SCS2 may be modified by the first signal processing unit 140 in order to prevent or reduce an optical interference between the first image frame and the second image frame. As a result, the shutter open period corresponding to the first voltage of the first and second shutter control signals SCS1 and SCS2 may be substantially narrowed by the first modification voltage FCV and the second modification voltage SCV.

Figure 10:
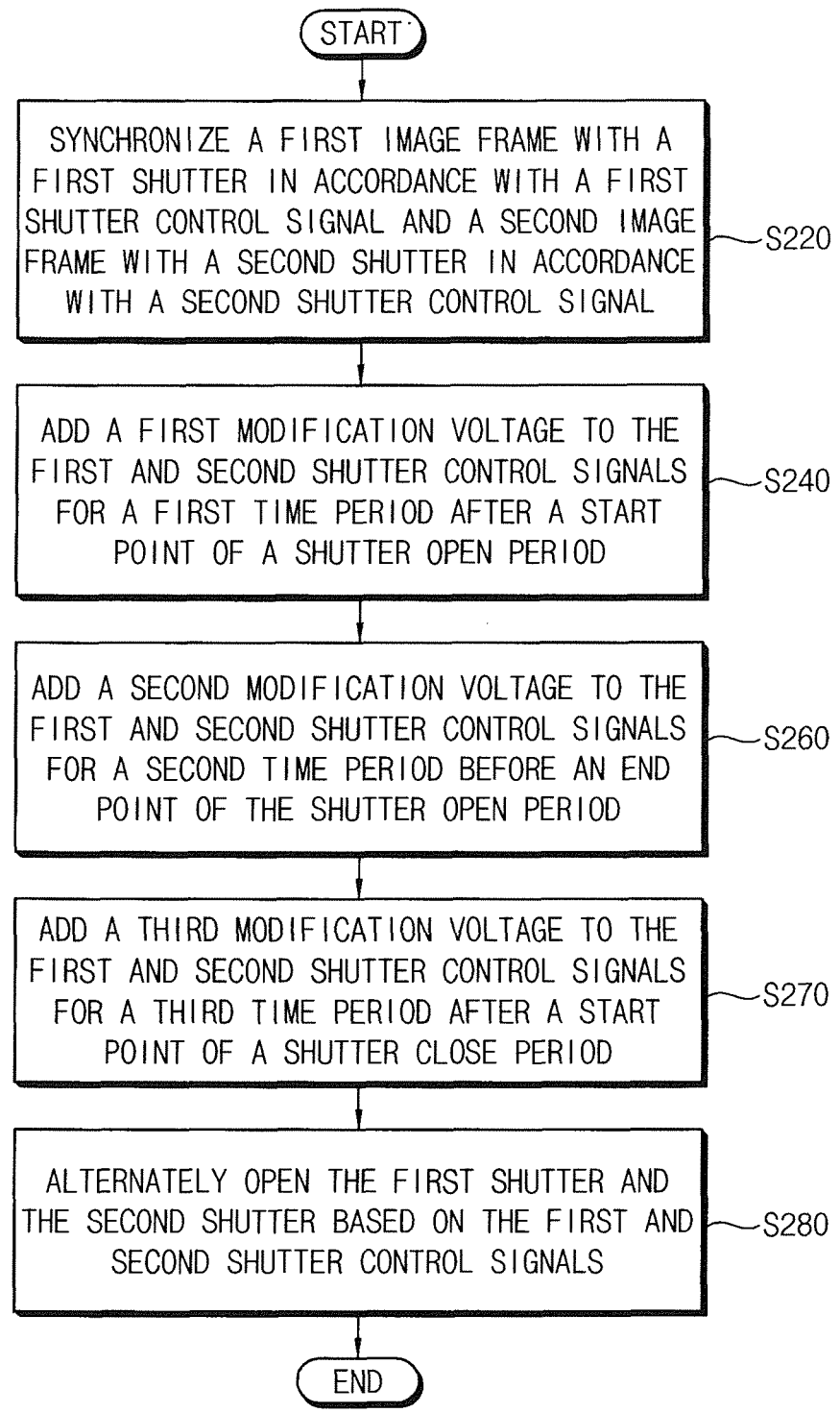
FIG. 10 is a flow chart illustrating a method of displaying stereoscopic images according to example embodiments of the present invention.

FIG. 10 is a flow chart illustrating a method of displaying stereoscopic images according to example embodiments.

Referring to FIG. 10, the method of FIG. 10 may include an operation of providing a first shutter control signal for synchronizing a first image frame with a first shutter, and a second shutter control signal for synchronizing a second image frame with a second shutter (Step S220), an operation of adding a first modification voltage to the first shutter control signal and the second shutter control signal for a first time period after a start point of a shutter open period corresponding to a first voltage (Step S240), an operation of adding a second modification voltage to the first shutter control signal and the second shutter control signal for a second time period before an end point of the shutter open period (Step S260), an operation of adding a third modification voltage to the first shutter control signal and the second shutter control signal for a third time period after a start point of a shutter close period corresponding to a second voltage (Step S270), and an operation of alternately opening the first shutter and the second shutter based on the first shutter control signal and the second shutter control signal (Step S280) when the first image frame and the second image frame are sequentially output.

The method of FIG. 10 modifies the first shutter control signal and the second shutter control signal in order to prevent or reduce an optical interference between the first image frame and the second image frame. In more detail, the method of FIG. 10 may provide the first shutter control signal for synchronizing the first image frame with the first shutter, and the second shutter control signal for synchronizing the second image frame with the second shutter (Step S220). Generally, a stereoscopic image signal includes a plurality of stereoscopic image frames, and each of the stereoscopic image frames is divided into the first image frame and the second image frame. According to some example embodiments, the stereoscopic image signal may be input by a high definition multimedia interface (HDMI). In one example embodiment, the first image frame may correspond to a left image frame, and the second image frame may correspond to a right image frame. The first image frame may include a first active period corresponding to first image data (e.g., left image data), and a first vertical blank for displaying the first image data. The second image frame may include a second active period corresponding to second image data (e.g., right image data), and a second vertical blank for displaying the second image data.

After the stereoscopic image frame is divided into the first image frame and the second image frame, the first image frame and the second image frame may be synchronized with the first shutter and the second shutter based on the first shutter control signal and the second shutter control signal, respectively. In one example embodiment, the first shutter may correspond to a left shutter of a pair of shutter glasses, and the second shutter may correspond to a right shutter of the shutter glasses. In more detail, the first shutter control signal may control open/close operations of the first shutter. For example, the first shutter control signal may control the first shutter to be open while the first image frame is output, and may control the first shutter to be closed while the second image frame is output. Likewise, the second shutter control signal may control open/close operations of the second shutter. For example, the second shutter control signal may control the second shutter to be closed while the first image frame is output, and may control the second shutter to be open while the second image frame is output.

As described above, a delay occurs when each shutter is opened or closed. Therefore, an optical interference between the first image frame and the second image frame may occur near a boundary between the shutter open period and the shutter close period of the first and second shutter control signals.

Hence, the method of FIG. 10 may add the first modification voltage to the first and second shutter control signals for the first time period after a start point of the shutter open period corresponding to the first voltage (Step S240), and may add the second modification voltage to the first and second shutter control signals for the second time period before an end point of the shutter open period (Step S260). In one example embodiment, the first voltage may be a ground (GND) voltage, and the second voltage may be a positive voltage or a negative voltage. In this case, the first shutter may be open when the first shutter control signal has a ground (GND) voltage, and may be closed when the first shutter control signal has a positive voltage or a negative voltage. Likewise, the second shutter may be open when the second shutter control signal has a ground (GND) voltage, and may be closed when the second shutter control signal has a positive voltage or a negative voltage. In another example embodiment, the first voltage may be a positive voltage or a negative voltage, and the second voltage may be a ground (GND) voltage. In this case, the first shutter may be open when the first shutter control signal has a positive voltage or a negative voltage, and may be closed when the first shutter control signal has a ground (GND) voltage. Likewise, the second shutter may be open when the second shutter control signal has a positive voltage or a negative voltage, and may be closed when the second shutter control signal has a ground (GND) voltage. Thus, open/close operations of the first shutter may be contrary to open/close operations of the second shutter because the first shutter control signal is contrary to the second shutter control signal.

In example embodiments, a magnitude of the first modification voltage has a constant value for the first time period, and a magnitude of the second modification voltage has a constant value for the second time period. In other words, the first modification voltage and the second modification voltage may be provided in a square-wave shape. Hence, the shutter open period corresponding to the first voltage in the first and second shutter control signals may be substantially narrowed by the first modification voltage and the second modification voltage. In an embodiment, a magnitude of the first modification voltage and a magnitude of the second modification voltage may be determined within a suitable range where an optical interference between the first image frame and the second image frame is prevented or reduced. In one example embodiment, a magnitude of the first modification voltage may be the same as a magnitude of the second modification voltage. In another example embodiment, a magnitude of the first modification voltage may be different from a magnitude of the second modification voltage. Further, the first time period and the second time period may be determined within a suitable range where an optical interference between the first image frame and the second image frame is prevented or reduced. In one example embodiment, the first time period may be the same as the second time period. In another example embodiment, the first time period may be different from the second time period. For example, if characteristics of timings where the first and second shutter control signals are changed from the shutter open period to the shutter close period are different from characteristics of timings where the first and second shutter control signals are changed from the shutter close period to the shutter open period, a magnitude of the first modification voltage may be determined to be different from a magnitude of the second modification voltage, and the first time period may be determined to be different from the second time period.

In example embodiments, a polarity of the first modification voltage may be the same as a polarity of the second modification voltage, and a polarity of the second voltage may be different from a polarity of the first modification voltage and a polarity of the second modification voltage. Here, the second voltage may correspond to the shutter close period of the first and second shutter control signals. For example, the first modification voltage and the second modification voltage may be negative voltages when the first voltage corresponding to the shutter open period is a ground (GND) voltage, and the second voltage corresponding to the shutter close period is a positive voltage. On the other hand, the first modification voltage and the second modification voltage may be positive voltages when the first voltage corresponding to the shutter open period is a ground (GND) voltage, and the second voltage corresponding to the shutter close period is a negative voltage. Thus, the method of FIG. 10 may modify the first shutter control signal and the second shutter control signal by adding the first modification voltage to the first and second shutter control signals for the first time period after a start point of the shutter open period, and by adding the second modification voltage to the first and second shutter control signals for the second time period before an end point of the shutter open period. As a result, an optical interference between the first image frame and the second image frame may be prevented or reduced because a rising time and a falling time between the shutter open period and the shutter close period decreases in the first shutter control signal and the second shutter control signal, respectively.

Additionally, the method of FIG. 10 may add the third modification voltage to the first and second shutter control signals for the third time period after a start point of the shutter close period corresponding to the second voltage (Step S270). In a first example embodiment, a magnitude of the third modification voltage has a constant value for the third time period. Namely, the third modification voltage may be provided in a square-wave shape. In a second example embodiment, a magnitude of the third modification voltage may decrease in a step shape for the third time period. In a third example embodiment, a magnitude of the third modification voltage may decrease in a curve shape for the third time period. In a fourth example embodiment, a magnitude of the third modification voltage may decrease in a straight line shape for the third time period. According to some example embodiments, the third modification voltage may be applied to the first and second shutter control signals to lengthen the shutter close period corresponding to the second voltage in the first and second shutter control signals. Thus, the method of FIG. 10 modifies the first shutter control signal and the second shutter control signal by adding the third modification voltage to the first and second shutter control signals for the third time period after a start point of the shutter close period. Therefore, an optical interference between the first image frame and the second image frame may be prevented or reduced because a rising time and a falling time between the shutter open period and the shutter close period decreases in the first shutter control signal and the second shutter control signal, respectively.

Then, the method of FIG. 10 alternately opens the first shutter and the second shutter based on the first shutter control signal and the second shutter control signal (Step S280) when the first image frame and the second image frame are sequentially output. As described above, the first shutter (e.g., a left shutter) may be open and the second shutter (e.g., a right shutter) may be closed while the first image frame (e.g., a left image frame) is output. On the other hand, the first shutter may be closed and the second shutter may be open while the second image frame (e.g., a right image frame) is output. For this operation, the shutter open period of the first shutter control signal may be adjusted for the first image frame to be output in the shutter open period of the first shutter control signal, and the shutter close period of the first shutter control signal may be adjusted for the second image frame to be output in the shutter close period of the first shutter control signal. Likewise, the shutter open period of the second shutter control signal may be adjusted for the second image frame to be output in the shutter open period of the second shutter control signal, and the shutter close period of the second shutter control signal may be adjusted for the first image frame to be output in the shutter close period of the second shutter control signal. Thus, open/close operations of the first shutter may be contrary to open/close operations of the second shutter because the first shutter control signal is contrary to the second shutter control signal.

The method of FIG. 10 modifies the first shutter control signal for synchronizing the first image frame with the first shutter and the second shutter control signal for synchronizing the second image frame with the second shutter by adding the first modification voltage to the first and second shutter control signals for the first time period after a start point of the shutter open period, by adding the second modification voltage to the first and second shutter control signals for the second time period before an end point of the shutter open period, and by adding the third modification voltage to the first and second shutter control signals for the third time period after a start point of the shutter close period. Therefore, an optical interference (e.g., overlapping) between the first image frame and the second image frame may be prevented or reduced by controlling open/close operations of the first shutter and the second shutter. As a result, the method of FIG. 10 may provide a high-quality stereoscopic image to the viewer by solving a crosstalk problem and/or a contrast degradation problem due to the optical interference. According to some example embodiments, the method of FIG. 10 may be implemented by a hardware system, a software system, or a combination thereof.

FIGS. 11 through 14 are timing diagrams illustrating embodiments in which a first shutter control signal and a second shutter control signal are modified by the method of FIG. 10.

Referring to FIGS. 11 through 14, the method of FIG. 10 may add the first modification voltage FCV to the first and second shutter control signals SCS1 and SCS2 for the first time period T1 after a start point of the shutter open period corresponding to the first voltage V1, and may add the second modification voltage SCV to the first and second shutter control signals SCS1 and SCS2 for the second time period T2 before an end point of the shutter open period corresponding to the first voltage V1. As illustrated in FIGS. 11 through 14, a magnitude of the first modification voltage FCV may have a constant value for the first time period T1, and a magnitude of the second modification voltage SCV may have a constant value for the second time period T2. In other words, the first modification voltage FCV and the second modification voltage SCV may be provided in a square-wave shape. As a result, the shutter open period corresponding to the first voltage V1 of the first and second shutter control signals SCS1 and SCS2 may be substantially narrowed by the first modification voltage FCV and the second modification voltage SCV. In example embodiments, the first voltage V1 may be a ground (GND) voltage, and the second voltage V2 may be a positive voltage. Thus, the first and second modification voltages FCV and SCV may be negative voltages.

In addition, the first time period T1 and the second time period T2 may be adjusted within a suitable range where an optical interference between the first image frame FF and the second image frame SF is prevented or reduced. Although it is illustrated in FIGS. 11 through 14 that the first time period T1 is substantially the same as the second time period T2, the first time period T1 may be different from the second time period T2 according to the conditions of various systems. Furthermore, a magnitude of the first modification voltage FCV and a magnitude of the second modification voltage SCV may be adjusted within a suitable range where an optical interference between the first image frame FF and the second image frame SF is prevented or reduced. Although it is illustrated in FIGS. 11 through 14 that a magnitude of the first modification voltage FCV is substantially the same as a magnitude of the second modification voltage SCV, a magnitude of the first modification voltage FCV may be different from a magnitude of the second modification voltage SCV according to the conditions of various systems. For example, if characteristics of timings where the first and second shutter control signals SCS1 and SCS2 are changed from the shutter open period to the shutter close period are different from characteristics of timings where the first and second shutter control signals SCS1 and SCS2 are changed from the shutter close period to the shutter open period, a magnitude of the first modification voltage FCV may be determined to be different from a magnitude of the second modification voltage SCV, and the first time period T1 may be determined to be different from the second time period T2. Therefore, a characteristic difference between both timings may be compensated for.

Figure 11:
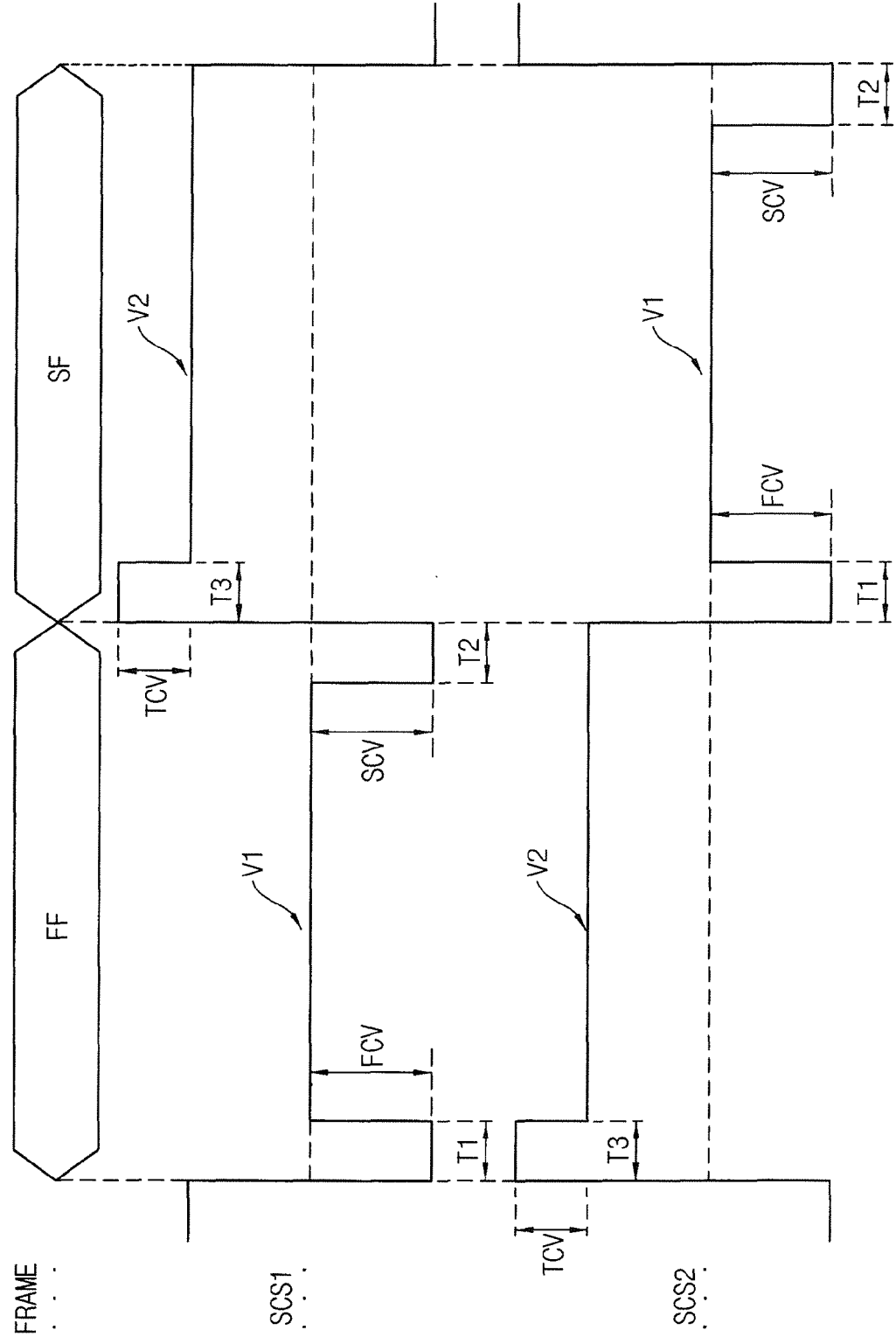
FIGS. 11 through 14 are timing diagrams illustrating embodiments in which a first shutter control signal and a second shutter control signal are modified by the method of FIG. 10.
Figure 12:
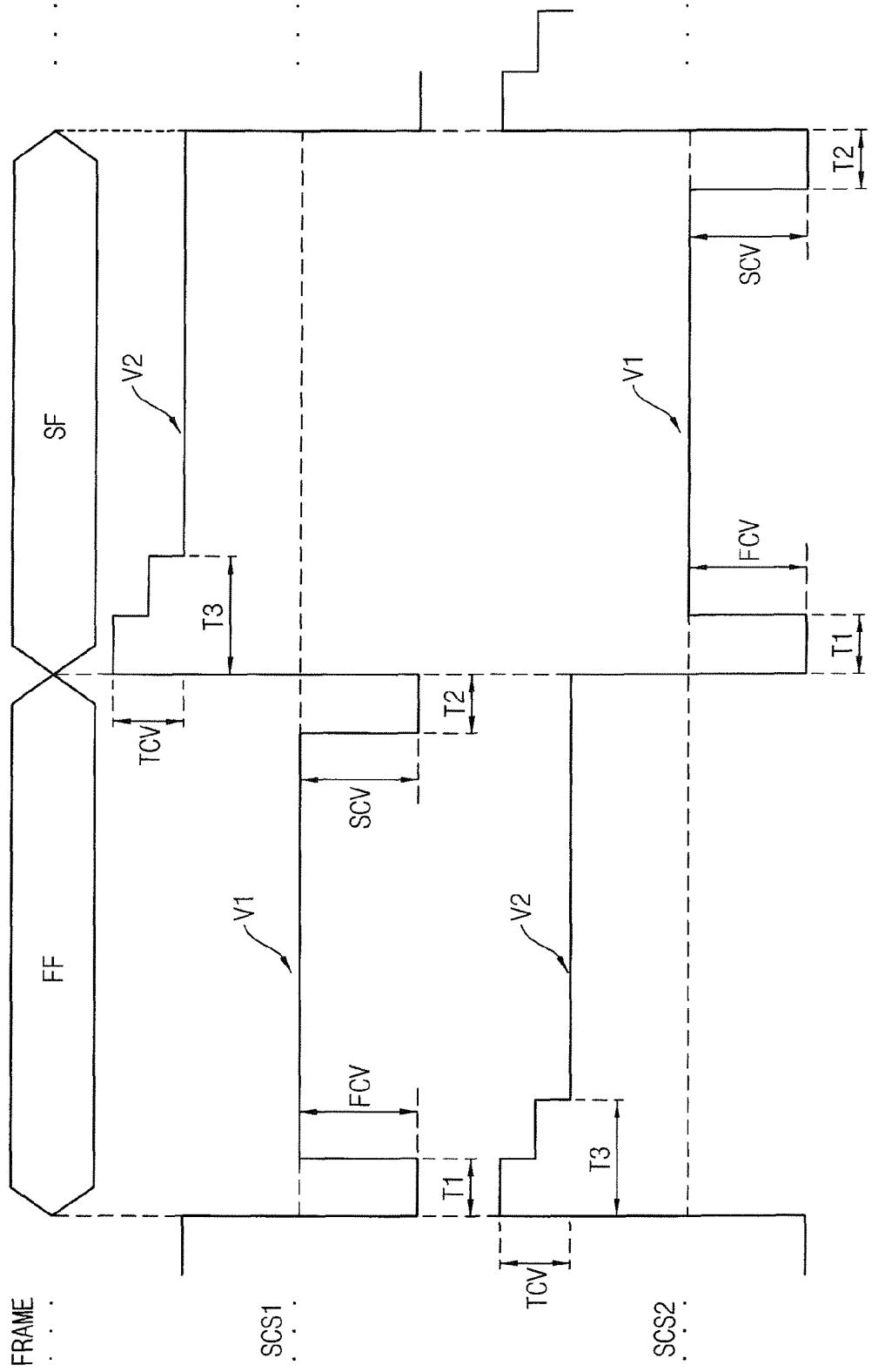
Figure 13:
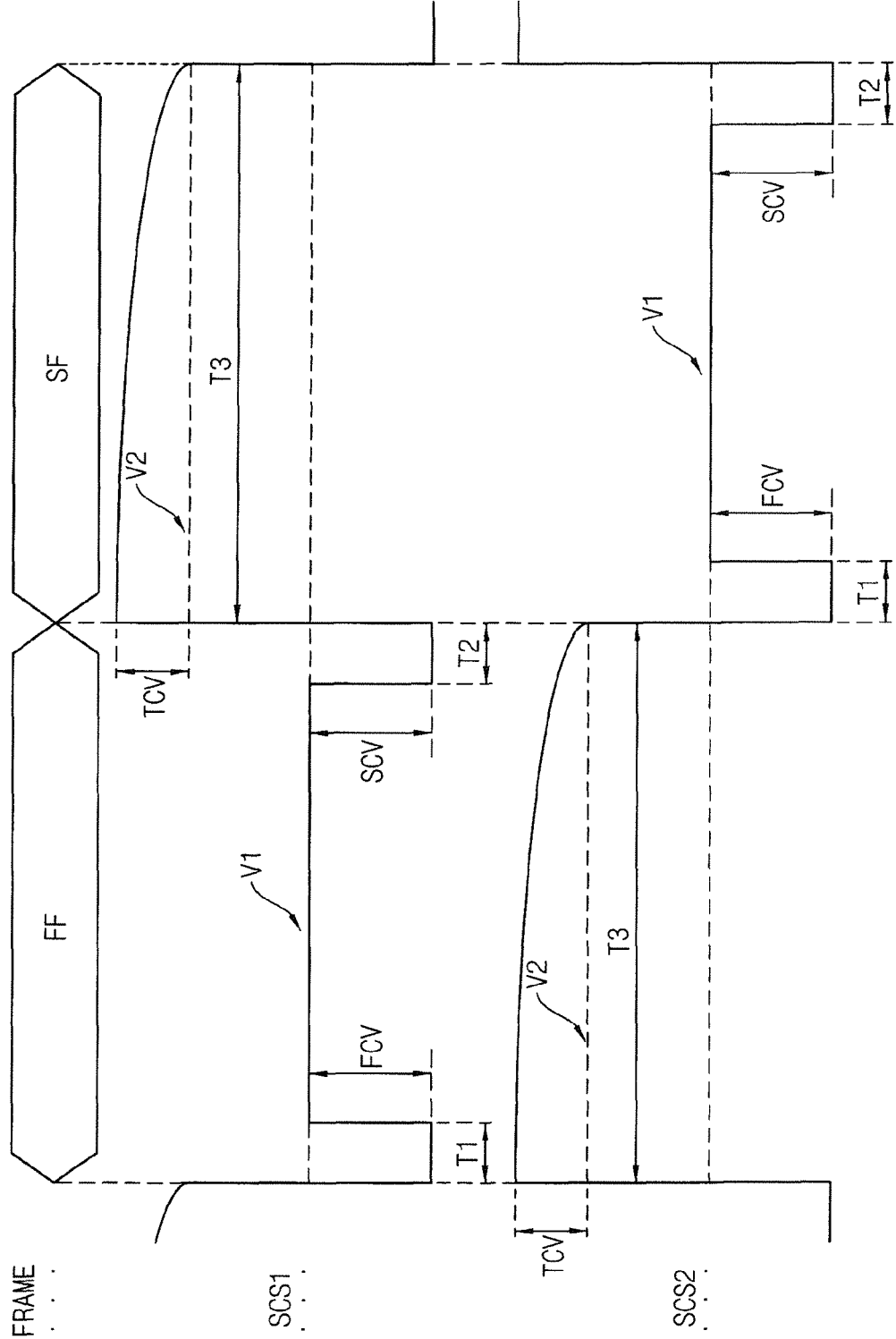
Figure 14:
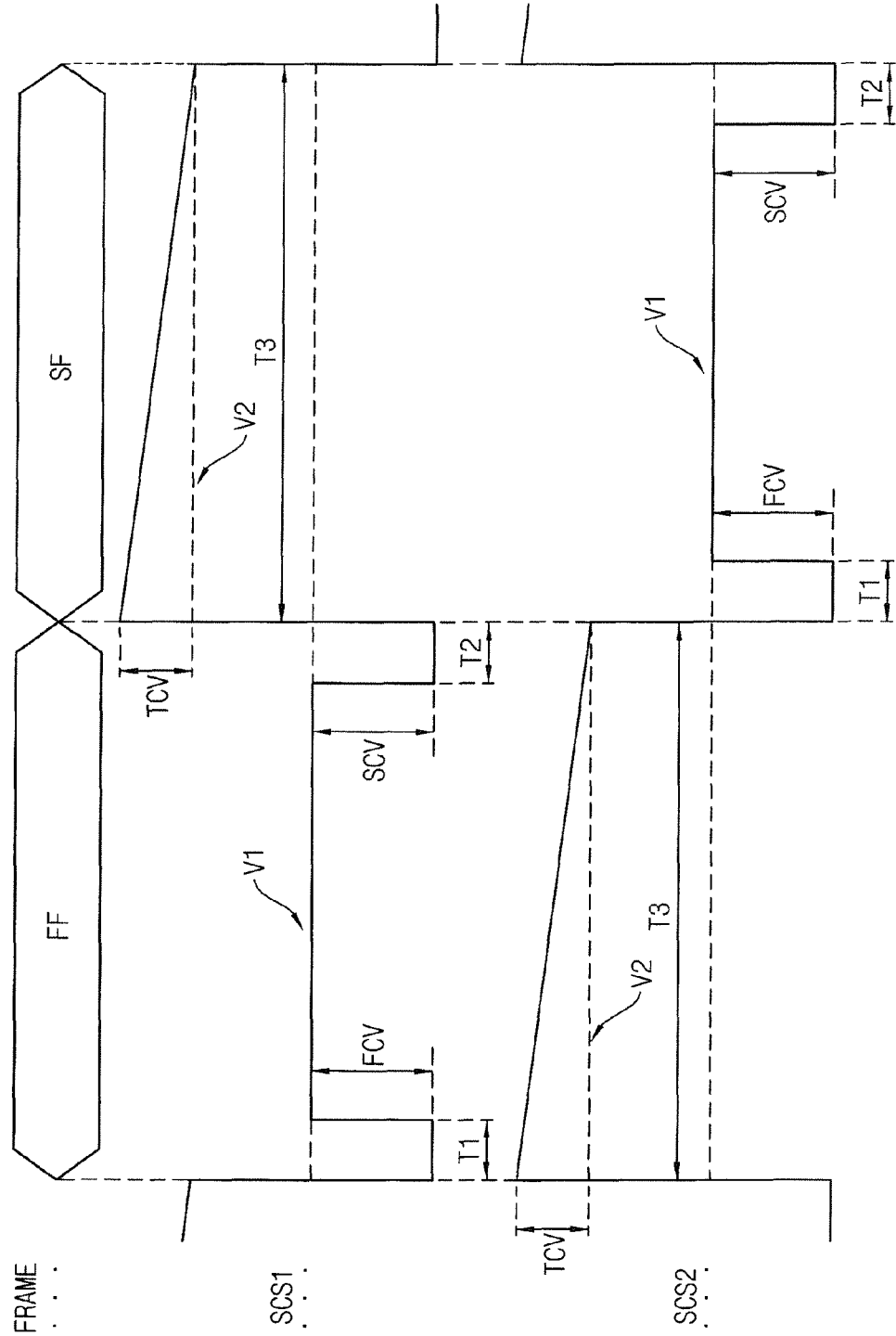

Additionally, the method of FIG. 10 may add the third modification voltage TCV to the first and second shutter control signals SCS1 and SCS2 for the third time period T3 after a start point of the shutter close period corresponding to the second voltage V2. Here, the third modification voltage TCV may be a positive voltage, whereas the first and second modification voltages FCV and SCV are negative voltages. It is illustrated in FIG. 11 that a magnitude of the third modification voltage TCV has a constant value for the third time period T3. That is, the third modification voltage TCV may be provided in a square-wave shape. It is illustrated in FIG. 12 that a magnitude of the third modification voltage TCV decreases in a step shape for the third time period T3. It is illustrated in FIG. 13 that a magnitude of the third modification voltage TCV decreases in a curve shape for the third time period T3. It is illustrated in FIG. 14 that a magnitude of the third modification voltage decreases in a straight line shape for the third time period T3. Therefore, the method of FIG. 10 may modify the first and second shutter control signals SCS1 and SCS2 to reduce a rising time and a falling time between the shutter open period and the shutter close period of the first and second shutter control signals SCS1 and SCS2.

As described above, the first shutter may be open and the second shutter may be closed while the first image frame FF is output. For this operation, the first shutter control signal SCS1 may have the first voltage V1 corresponding to the shutter open period, and the second shutter control signal SCS2 may have the second voltage V2 corresponding to the shutter close period. On the other hand, the first shutter may be closed and the second shutter may be open while the second image frame SF is output. For this operation, the first shutter control signal SCS1 may have the second voltage V2 corresponding to the shutter close period, and the second shutter control signal SCS2 may have the first voltage V1 corresponding to the shutter open period. That is, open/close operations of the first shutter may be contrary to open/close operations of the second shutter because the first shutter control signal SCS1 is contrary to the second shutter control signal SCS2. Generally, a delay occurs when each shutter is opened or closed. Hence, an optical interference between the first image frame FF and the second image frame SF may occur near a boundary between the shutter open period and the shutter close period of the first and second shutter control signals SCS1 and SCS2. To solve this problem, as described above, the method of FIG. 10 may prevent or reduce an optical interference between the first image frame FF and the second image frame SF by adding the first modification voltage FCV to the first and second shutter control signals SCS1 and SCS2 for the first time period T1 after a start point of the shutter open period, by adding the second modification voltage SCV to the first and second shutter control signals SCS1 and SCS2 for the second time period T2 before an end point of the shutter open period, and by adding the third modification voltage TCV to the first and second shutter control signals SCS1 and SCS2 for the third time period T3 after a start point of the shutter close period.

FIGS. 15 through 18 are timing diagrams illustrating other embodiments in which a first shutter control signal and a second shutter control signal are modified by the method of FIG. 10.

Referring to FIGS. 15 through 18, the method of FIG. 10 may add the first modification voltage FCV to the first and second shutter control signals SCS1 and SCS2 for the first time period T1 after a start point of the shutter open period corresponding to the first voltage V1, and may add the second modification voltage SCV to the first and second shutter control signals SCS1 and SCS2 for the second time period T2 before an end point of the shutter open period corresponding to the first voltage V1. As illustrated in FIGS. 15 through 18, a magnitude of the first modification voltage FCV may have a constant value for the first time period T1, and a magnitude of the second modification voltage SCV may have a constant value for the second time period T2. In other words, the first and second modification voltages FCV and SCV may be provided in a square-wave shape. As a result, the shutter open period corresponding to the first voltage V1 of the first and second shutter control signals SCS1 and SCS2 may be substantially narrowed by the first modification voltage FCV and the second modification voltage SCV. In example embodiments, the first voltage V1 may be a ground (GND) voltage, and the second voltage V2 may be a negative voltage. Thus, the first and second modification voltages FCV and SCV may be positive voltages.

In addition, the first time period T1 and the second time period T2 may be adjusted within a suitable range where an optical interference between the first image frame FF and the second image frame SF is prevented or reduced. Although it is illustrated in FIGS. 15 through 18 that the first time period T1 is substantially the same as the second time period T2, the first time period T1 may be different from the second time period T2 according to the conditions of various systems. Furthermore, a magnitude of the first modification voltage FCV and a magnitude of the second modification voltage SCV may be adjusted within a suitable range where an optical interference between the first image frame FF and the second image frame SF is prevented or reduced. Although it is illustrated in FIGS. 15 through 18 that a magnitude of the first modification voltage FCV is substantially the same as a magnitude of the second modification voltage SCV, a magnitude of the first modification voltage FCV may be different from a magnitude of the second modification voltage SCV according to the conditions of various systems. For example, if characteristics of timings where the first and second shutter control signals SCS1 and SCS2 are changed from the shutter open period to the shutter close period are different from characteristics of timings where the first and second shutter control signals SCS1 and SCS2 are changed from the shutter close period to the shutter open period, a magnitude of the first modification voltage FCV may be determined to be different from a magnitude of the second modification voltage SCV, and the first time period T1 may be determined to be different from the second time period T2. Therefore, a characteristic difference between both timings may be compensated for.

Figure 15:
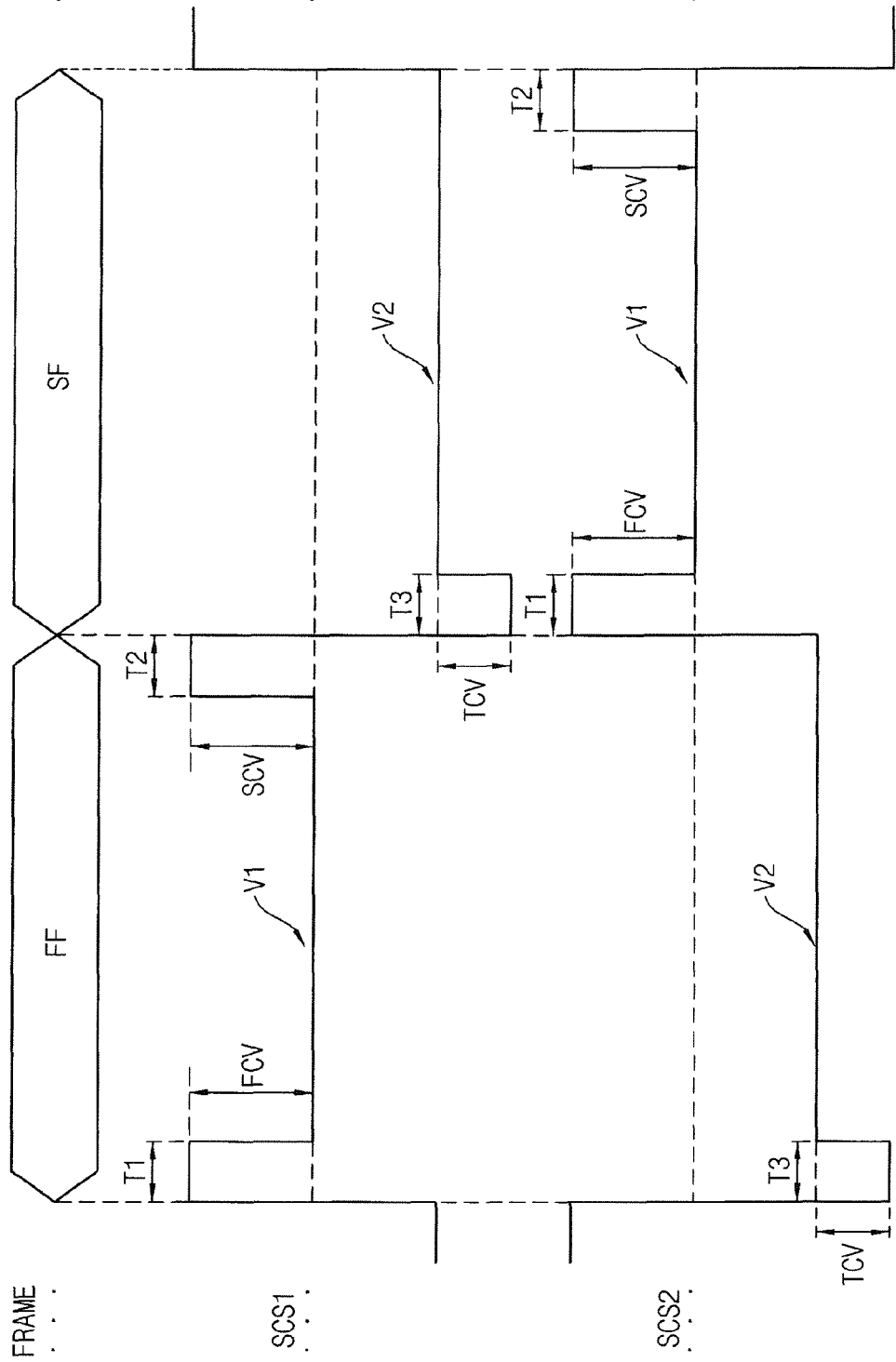
FIGS. 15 through 18 are timing diagrams illustrating other embodiments in which a first shutter control signal and a second shutter control signal are modified by the method of FIG. 10.
Figure 16:
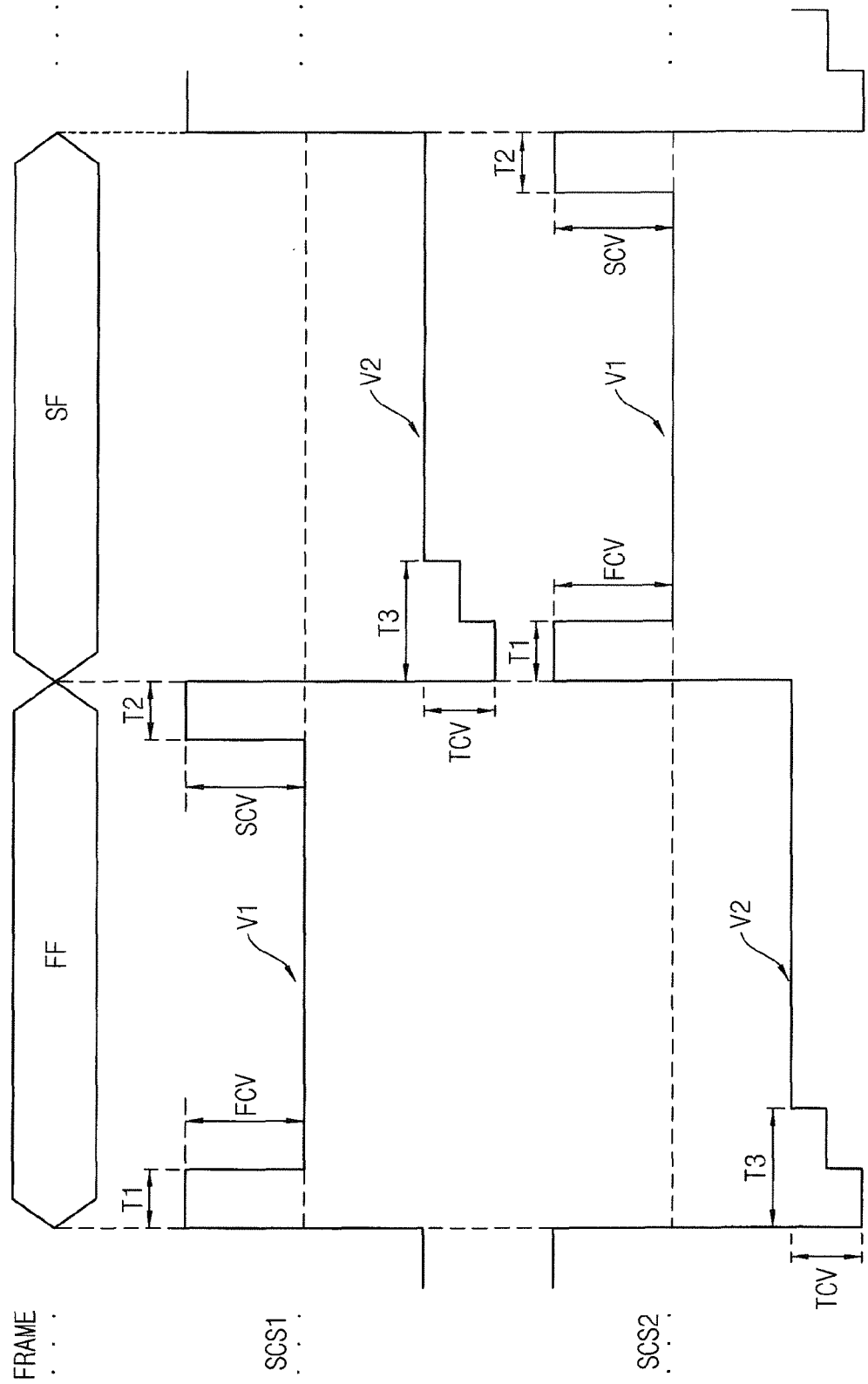
Figure 17:
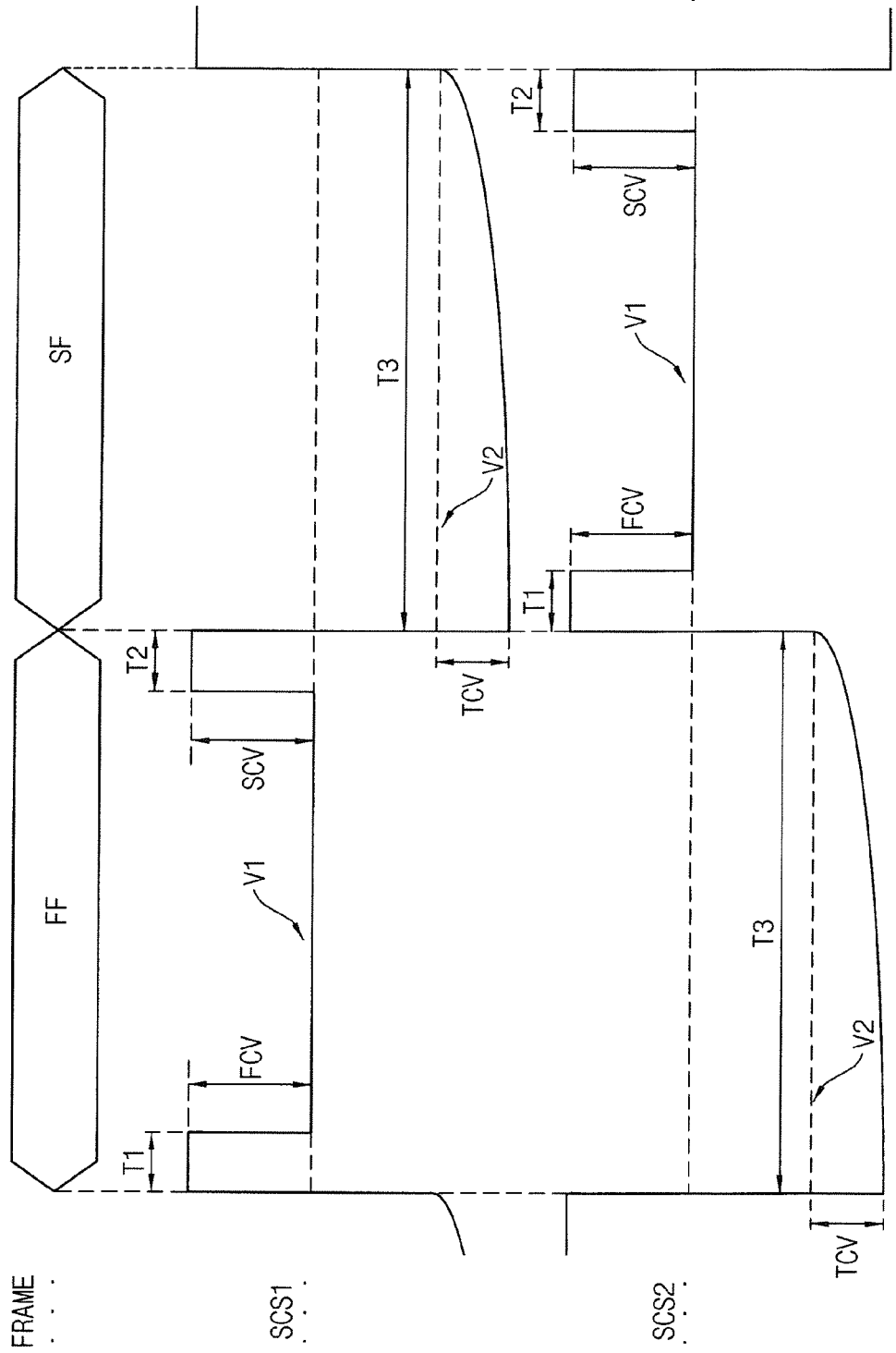
Figure 18:
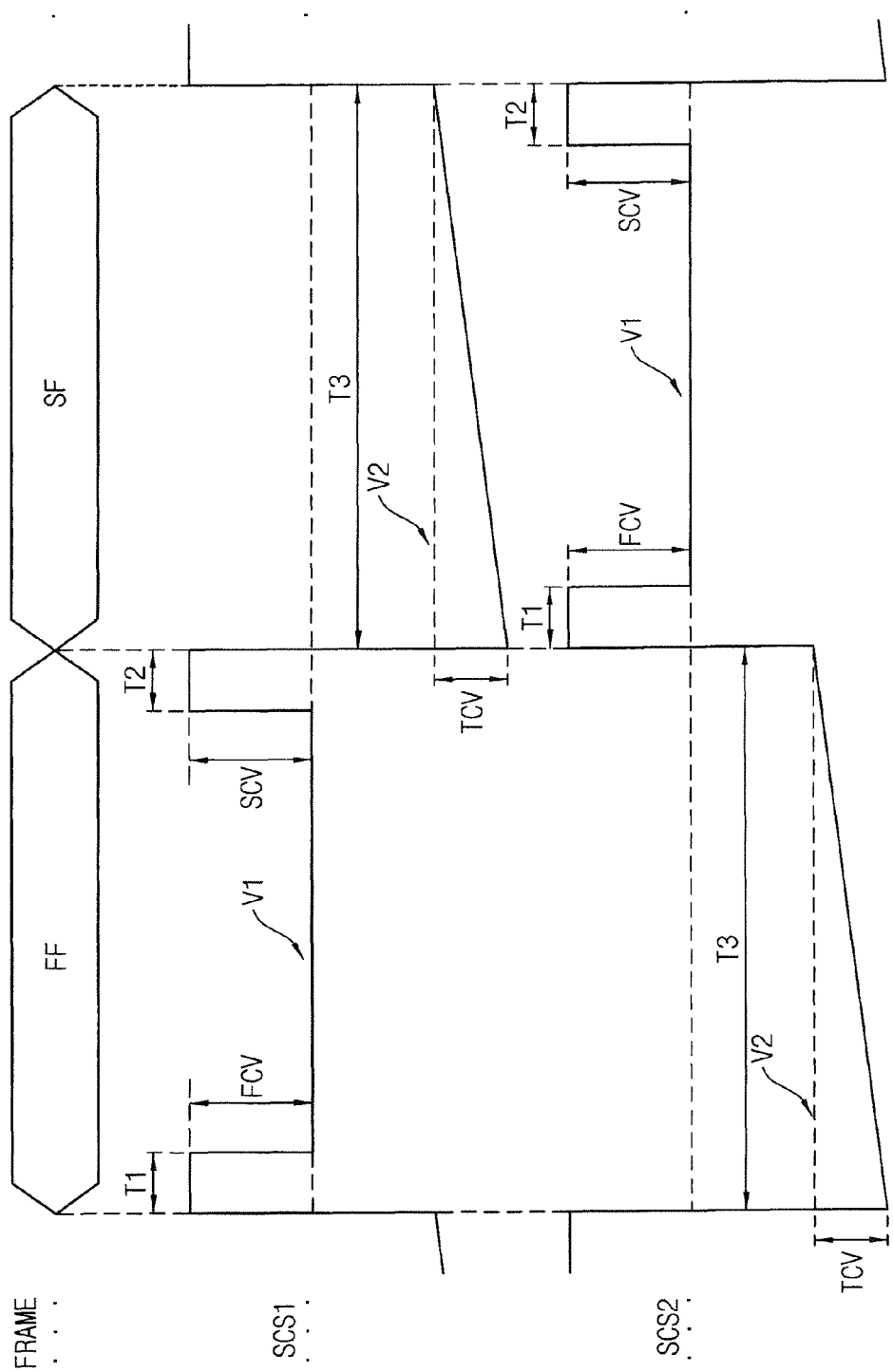

Additionally, the method of FIG. 10 may add the third modification voltage TCV to the first and second shutter control signals SCS1 and SCS2 for the third time period T3 after a start point of the shutter close period corresponding to the second voltage V2. Here, the third modification voltage TCV may be a negative voltage, whereas the first and second modification voltages FCV and SCV are positive voltages. It is illustrated in FIG. 15 that a magnitude of the third modification voltage TCV has a constant value for the third time period T3. That is, the third modification voltage TCV may be provided in a square-wave shape. It is illustrated in FIG. 16 that a magnitude of the third modification voltage TCV decreases in a step shape for the third time period T3. It is illustrated in FIG. 17 that a magnitude of the third modification voltage TCV decreases in a curve shape for the third time period T3. It is illustrated in FIG. 18 that a magnitude of the third modification voltage decreases in a straight line shape for the third time period T3. As described above, the method of FIG. 10 may modify the first and second shutter control signals SCS1 and SCS2 to reduce a rising time and a falling time between the shutter open period and the shutter close period of the first and second shutter control signals SCS1 and SCS2.

Figure 19:
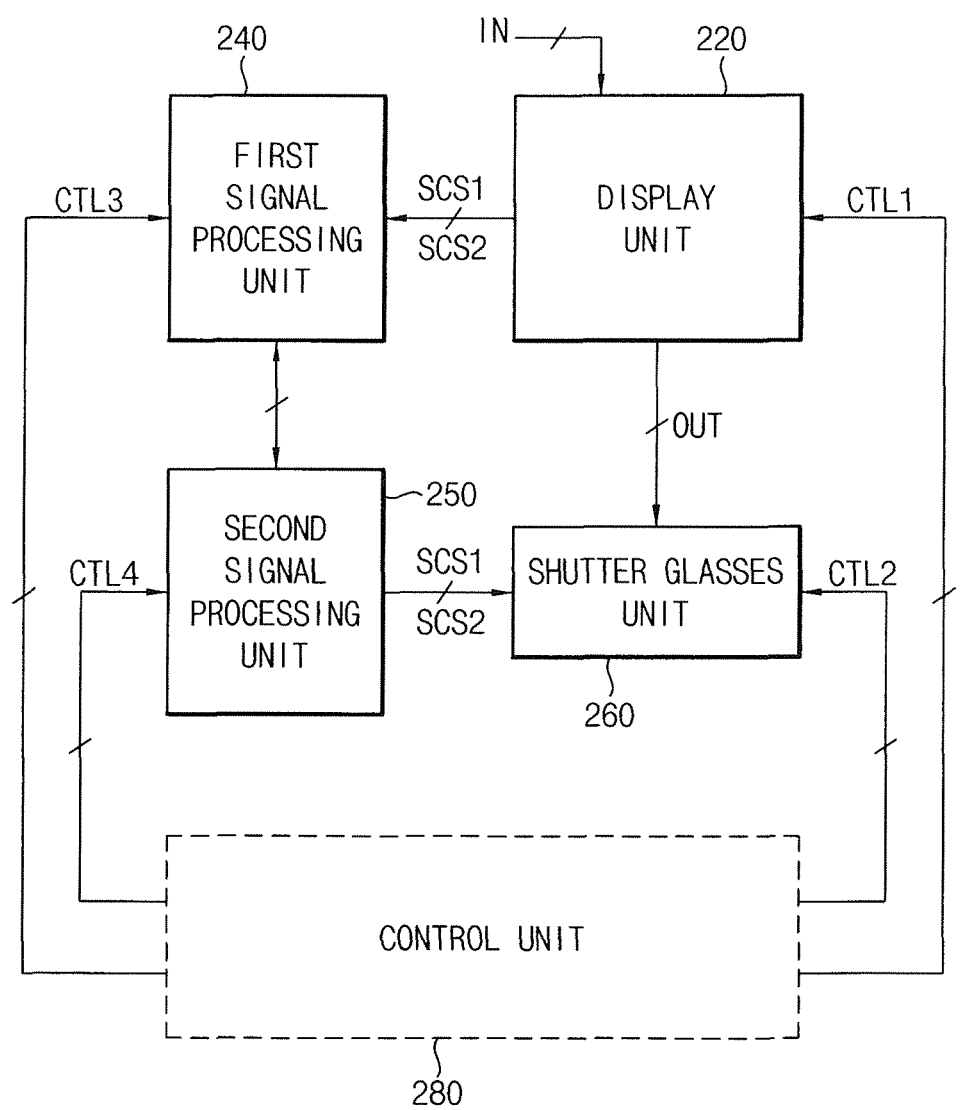
FIG. 19 is a block diagram illustrating a stereoscopic image display device according to example embodiments of the present invention.

FIG. 19 is a block diagram illustrating a stereoscopic image display device according to example embodiments.

Referring to FIG. 19, the stereoscopic image display device 200 may include a display unit 220, a first signal processing unit 240, a second signal processing unit 250, and a shutter glasses unit 260. In example embodiments, the stereoscopic image display device 200 may further include a control unit 280 that controls the display unit 220, the first signal processing unit 240, the second signal processing unit 250, and the shutter glasses unit 260.

The display unit 220 may receive a stereoscopic image frame (i.e., IN), may divide the stereoscopic image frame into a first image frame and a second image frame, and may alternately output the first image frame and the second image frame (i.e., OUT) based on a first shutter control signal SCS1 and a second shutter control signal SCS2. According to some example embodiments, the display unit 220 may operate based on a first control signal CTL1 output from the control unit 280. Although it is illustrated in FIG. 19 that the control unit 280 is placed outside the display unit 220, the control unit 280 may be placed within the display unit 220 according to the conditions of various systems. In one example embodiment, the display unit 220 may include a frame converter that divides the stereoscopic image frame into the first image frame and the second image frame, a display panel that alternately outputs the first image frame and the second image frame, and a display driver that drives the display panel. The display unit 220 may include a back-light unit when the display panel is an LCD panel. The display unit 220 may not include a back-light unit when the display panel is an OLED panel.

The first signal processing unit 240 may add a first modification voltage to the first and second shutter control signals SCS1 and SCS2 for a first time period after a start point of a shutter open period corresponding to a first voltage, and may add a second modification voltage to the first and second shutter control signals SCS1 and SCS2 for a second time period before an end point of the shutter open period. That is, the first signal processing unit 240 may modify the first and second shutter control signals SCS1 and SCS2 to prevent or reduce an optical interference between the first image frame and the second image frame, and may provide the first and second shutter control signals SCS1 and SCS2 to the second signal processing unit 250. According to some example embodiments, the first signal processing unit 240 may operate based on a third control signal CTL3 output from the control unit 280. In one example embodiment, the first signal processing unit 240 may include a shutter control signal input unit that receives the first shutter control signal SCS1 and the second shutter control signal SCS2, a shutter control signal modification unit that modifies the first shutter control signal SCS1 and the second shutter control signal SCS2 to prevent or reduce an optical interference between the first image frame and the second image frame, and a shutter control signal output unit that outputs the first shutter control signal SCS1 and the second shutter control signal SCS2 to the second signal processing unit 250.

When the first signal processing unit 240 modifies the first shutter control signal SCS1 and the second shutter control signal SCS2, a magnitude of the first modification voltage may have a constant value for the first time period, and a magnitude of the second modification voltage may have a constant value for the second time period. In other words, the first and second modification voltages may be provided in a square-wave shape. As a result, the shutter open period corresponding to the first voltage of the first and second shutter control signals SCS1 and SCS2 may be substantially narrowed by the first modification voltage and the second modification voltage. In one example embodiment, the first voltage may be a ground (GND) voltage, and the second voltage may be a positive voltage or a negative voltage. In another example embodiment, the first voltage may be a positive voltage or a negative voltage, and the second voltage may be a ground (GND) voltage. Here, a polarity of the first modification voltage may be the same as a polarity of the second modification voltage, and a polarity of the second voltage corresponding to the shutter close period may be different from a polarity of the first modification voltage and a polarity of the second modification voltage. In addition, a magnitude of the first modification voltage may be the same as a magnitude of the second modification voltage, or a magnitude of the first modification voltage may be different from a magnitude of the second modification voltage. Furthermore, the first time period may be the same as the second time period, or the first time period may be different from the second time period.

The second signal processing unit 250 may add the third modification voltage to the first and second shutter control signals SCS1 and SCS2 for the third time period T3 after a start point of the shutter close period corresponding to the second voltage. That is, the second signal processing unit 250 may modify the first and second shutter control signals SCS1 and SCS2 to prevent or reduce an optical interference between the first image frame and the second image frame, and may provide the first and second shutter control signals SCS1 and SCS2 to the shutter glasses unit 260. According to some example embodiments, the second signal processing unit 250 may operate based on a fourth control signal CTL4 output from the control unit 280. In one example embodiment, the second signal processing unit 250 may include a shutter control signal input unit that receives the first shutter control signal SCS1 and the second shutter control signal SCS2, a shutter control signal modification unit that modifies the first shutter control signal SCS1 and the second shutter control signal SCS2 to prevent or reduce an optical interference between the first image frame and the second image frame, and a shutter control signal output unit that outputs the first shutter control signal SCS1 and the second shutter control signal SCS2 to the shutter glasses unit 260. Here, the third modification voltage may be provided in various shapes according to the conditions of various systems. For example, the third modification voltage may be provided for the third time period in a square-wave shape, in a step shape, in a curve shape, or in a straight line shape. In addition, the third modification voltage may be applied to the first and second shutter control signals SCS1 and SCS2 to lengthen the shutter close period corresponding to the second voltage of the first and second shutter control signals SCS1 and SCS2.

The shutter glasses unit 260 may alternately open the first shutter and the second shutter based on the first shutter control signal SCS1 and the second shutter control signal SCS2, respectively. For example, the first and second shutter control signals SCS1 and SCS2 may be provided to the shutter glasses unit 260 by various wire/wireless techniques. According to some example embodiments, the shutter glasses unit 260 may operate based on a second control signal CTL2 output from the control unit 280. In one example embodiment, the shutter glasses unit 260 may include a first shutter, a second shutter, and a shutter driving unit that drives the first shutter and the second shutter. For example, the first and second shutters may be liquid crystal shutters. The shutter glasses unit 260 may open the first shutter, and may close the second shutter while the first image frame is output from the display unit 220. In this case, the first shutter control signal SCS1 may have the first voltage corresponding to the shutter open period, and the second shutter control signal SCS2 may have the second voltage corresponding to the shutter close period when the first image frame is output from the display unit 220. On the other hand, the shutter glasses unit 260 may open the second shutter, and may close the first shutter while the second image frame is output from the display unit 220. In this case, the first shutter control signal SCS1 may have the second voltage corresponding to the shutter close period, and the second shutter control signal SCS2 may have the first voltage corresponding to the shutter open period when the second image frame is output from the display unit 220. Thus, open/close operations of the first shutter may be contrary to open/close operations of the second shutter because the first shutter control signal SCS1 is contrary to the second shutter control signal SCS2.

As described above, the stereoscopic image display device 200 may modify the first shutter control signal SCS1 for synchronizing the first image frame with the first shutter and the second shutter control signal SCS2 for synchronizing the second image frame with the second shutter by adding the first modification voltage to the first and second shutter control signals SCS1 and SCS2 for the first time period after a start point of the shutter open period, by adding the second modification voltage to the first and second shutter control signals SCS1 and SCS2 for the second time period before an end point of the shutter open period, and by adding the third modification voltage to the first and second shutter control signals SCS1 and SCS2 for the third time period after a start point of the shutter close period. Thus, an optical interference (e.g., overlapping) between the first image frame (e.g., a left image frame) and the second image frame (e.g., a right image frame) may be prevented or reduced by controlling open/close operations of the first shutter (e.g., a left shutter) and the second shutter (e.g., a right shutter) of the shutter glasses unit 260. That is, an optical interference between the first image frame and the second image frame may be prevented or reduced because a rising time and a falling time between the shutter open period and the shutter close period of the first and second shutter control signals SCS1 and SCS2 are reduced. As a result, the stereoscopic image display device 200 may provide a high-quality stereoscopic image to a viewer by solving a crosstalk problem or a contrast degradation problem due to the optical interference.

Figure 20:
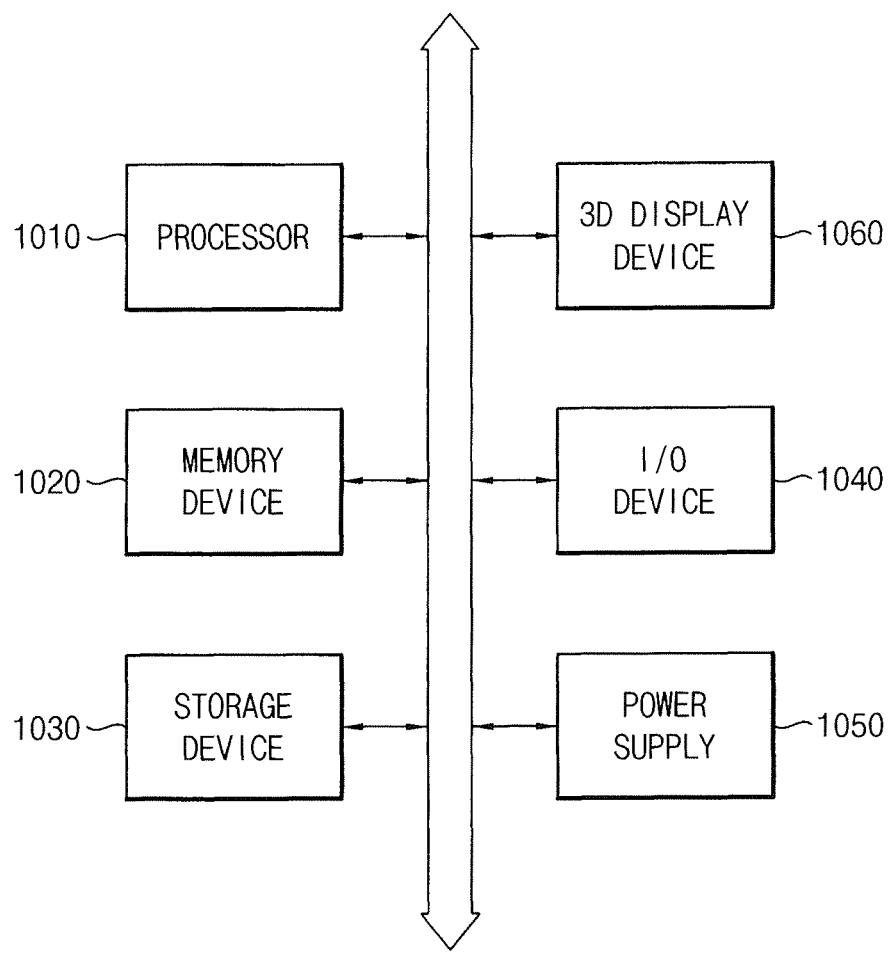
FIG. 20 is a block diagram illustrating an electric device having a stereoscopic image display device according to example embodiments of the present invention.

FIG. 20 is a block diagram illustrating an electric device having a stereoscopic image display device according to example embodiments.

Referring to FIG. 20, the electric device 1000 may include a processor 1010, a memory device 1020, a storage device 1030, an input/output (I/O) device 1040, a power supply 1050, and a stereoscopic image display device 1060. Here, the stereoscopic image display device 1060 may correspond to the stereoscopic image display device 100 of FIG. 6, or the stereoscopic image display device 200 of FIG. 19. The electric device 1000 may further include a plurality of ports for communicating with a video card, a sound card, a memory card, a universal serial bus (USB) device, other electric devices, etc.

The processor 1010 may perform various computing functions. The processor 1010 may be a microprocessor, a central processing unit (CPU), etc. The processor 1010 may be coupled to other components via an address bus, a control bus, a data bus, etc. Further, the processor 1010 may be coupled to an extended bus such as a peripheral component interconnection (PCI) bus. The memory device 1020 may store data for operations of the electric device 1000. The memory device 1020 may include at least one non-volatile memory device and at least one volatile memory device. For example, the non-volatile memory device may correspond to an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc. In addition, the volatile memory device may correspond to a dynamic random access memory (DRAM) device, a static random access memory (SRAM) device, a mobile dynamic random access memory (mobile DRAM) device, etc. The storage device 1030 may be a solid state drive device, a hard disk drive device, a CD-ROM device, etc. The I/O device 1040 may be an input device such as a keyboard, a keypad, a mouse, a touch screen, etc, and an output device such as a printer, a speaker, etc. In some example embodiments, the stereoscopic image display device 1060 may be included as the output device in the I/O device 1040. The power supply 1050 may provide power for operating the electric device 1000.

The stereoscopic image display device 1060 may communicate with other components via the buses or other communication links. As described above, the stereoscopic image signal having a plurality of stereoscopic image frames. The stereoscopic image display device 1060 may divide each stereoscopic image frame into the first image frame (e.g., a left image frame) and the second image frame (e.g., a right image frame), and may sequentially provide the first image frame and the second image frame to a left eye and a right eye, respectively. Here, the stereoscopic image display device 1060 may modify the first shutter control signal for synchronizing the first image frame with the first shutter and the second shutter control signal for synchronizing the second image frame with the second shutter in order to prevent or reduce an optical interference between the first image frame and the second image frame. In one example embodiment, the stereoscopic image display device 1060 may include a display unit, a first signal processing unit, and the shutter glasses unit. In another example embodiment, the stereoscopic image display device 1060 may include a display unit, a first signal processing unit, a second signal processing unit, and the shutter glasses unit. Since components of the stereoscopic image display device 1060 are described above, duplicated descriptions of the stereoscopic image display device 1060 will be omitted. As described above, the stereoscopic image display device 1060 may provide a high-quality stereoscopic image to a viewer by solving a crosstalk problem or a contrast degradation problem due to the optical interference.

The present invention may be applied to a stereoscopic image display device and a system having the stereoscopic image display device. For example, the present invention may be applied to a television, a computer monitor, a laptop computer, a digital camera, a cellular phone, a smart phone, a personal digital assistant (PDA), a portable multimedia player (PMP), an MP3 player, a navigation system, a video phone, etc. The foregoing are illustrative embodiments, and are not to be construed as limiting the present invention. Although a few example embodiments have been described, those skilled in the art will readily appreciate that many modifications are possible in the example embodiments without materially departing from the novel teachings and aspects of the present invention. Accordingly, all such modifications are intended to be included within the scope of the present invention as defined in the claims, and equivalents thereof.

What is claimed is:

1. A method of displaying stereoscopic images, comprising:
   synchronizing a first image frame with a first shutter in accordance with a first shutter control signal and synchronizing a second image frame with a second shutter in accordance with a second shutter control signal, the first image frame and the second image frame corresponding to a stereoscopic image frame;
   modifying the first shutter control signal by adding a first modification voltage to a shutter open period of the first shutter control signal, the first modification voltage being added for a first time period beginning at a start point of the first image frame and by adding a second modification voltage to the shutter open period of the first shutter control signal, the second modification voltage being added for a second time period ending at an end point of the first image frame, the first shutter control signal having a voltage different from the first modification voltage and the second modification voltage during a portion of the shutter open period between the first time period and the second time period, the shutter open period of the first shutter control signal corresponding to a first voltage;
   modifying the second shutter control signal by adding the first modification voltage to a shutter open period of the second shutter control signal, the first modification voltage being added for the first time period beginning at a start point of the second image frame and by adding the second modification voltage to the shutter open period of the second shutter control signal, the second modification voltage being added for the second time period ending at an end point of the second image frame, the second shutter control signal having a voltage different from the first modification voltage and the second modification voltage during a portion of the shutter open period between the first time period and the second time period, the shutter open period of the second shutter control signal corresponding to the first voltage; and
   alternately opening the first shutter and the second shutter based on the first shutter control signal and the second shutter control signal when the first image frame and the second image frame are sequentially output,
   wherein the first shutter and the second shutter are closed during the first time period and the first shutter and the second shutter are closed during the second time period, and
   wherein the first shutter control signal has a voltage different from a voltage of the second shutter control signal during the first time period and the second time period.

2. The method of claim 1, wherein the first image frame is a left image frame, and the second image frame is a right image frame.

3. The method of claim 2, wherein the first shutter is a left shutter, and the second shutter is a right shutter.

4. The method of claim 1, further comprising:
   modifying the first shutter control signal by adding a third modification voltage to a shutter close period of the first shutter control signal for a third time period beginning at the end point of the first image frame, the shutter close period of the first shutter control signal corresponding to a second voltage; and modifying the second shutter control signal by adding the third modification voltage to a shutter close period of the second shutter control signal for the third time period beginning at the end point of the second image frame, the shutter close period of the second shutter control signal corresponding to the second voltage.

5. The method of claim 4, wherein the first voltage is a ground voltage, and the second voltage is a positive voltage or a negative voltage.

6. The method of claim 4, wherein the second voltage is a ground voltage, and the first voltage is a positive voltage or a negative voltage.

7. The method of claim 4, wherein a magnitude of the first modification voltage has a constant value for the first time period, and a magnitude of the second modification voltage has a constant value for the second time period.

8. The method of claim 7, wherein the magnitude of the first modification voltage is the same as the magnitude of the second modification voltage.

9. The method of claim 7, wherein the magnitude of the first modification voltage is different from the magnitude of the second modification voltage.

10. The method of claim 4, wherein a polarity of the first modification voltage is the same as a polarity of the second modification voltage.

11. The method of claim 10, wherein a polarity of the second voltage is different from the polarity of the first modification voltage and the polarity of the second modification voltage.

12. The method of claim 4, wherein a magnitude of the third modification voltage has a constant value for the third time period.

13. The method of claim 4, wherein a magnitude of the third modification voltage decreases in a step shape for the third time period.

14. The method of claim 4, wherein a magnitude of the third modification voltage decreases in a curve shape for the third time period.

15. The method of claim 4, wherein a magnitude of the third modification voltage decreases in a straight line shape for the third time period.

16. The method of claim 4, wherein the first time period is determined to be the same as the second time period.

17. The method of claim 4, wherein the first time period is determined to be different from the second time period.

18. A stereoscopic image display device comprising:
a display unit configured to receive a stereoscopic image frame, to divide the stereoscopic image frame into a first image frame and a second image frame, and to alternately output the first image frame and the second image frame based on a first shutter control signal and a second shutter control signal;
a first signal processing unit
configured to modify the first shutter control signal by adding a first modification voltage to a shutter open period of the first shutter control signal, the first modification voltage being added for a first time period beginning at a start point of the first image frame and by adding a second modification voltage to the shutter open period of the first shutter control signal, the second modification voltage being added for a second time period ending at an end point of the first image frame, the first shutter control signal having a voltage different from the first modification voltage and the second modification voltage during a portion of the shutter open period between the first time period and the second time period and configured to modify the second shutter control signal by adding the first modification voltage to a shutter open period of the second shutter control signal, the first modification voltage being added for the first time period beginning at a start point of the second image frame and by adding the second modification voltage to the shutter open period of the second shutter control signal, the second modification voltage being added for the second time period ending at an end point of the second image frame, the second shutter control signal having a voltage different from the first modification voltage and the second modification voltage during a portion of the shutter open period between the first time period and the second time period,
wherein the shutter open period of the first shutter control signal and the shutter open period of the second shutter control signal correspond to a first voltage; and
a shutter glasses unit configured to alternately open a first shutter and a second shutter based on the first shutter control signal and the second shutter control signal,
wherein the first shutter and the second shutter are closed during the first time period and the first shutter and the second shutter are closed during the second time period, and
wherein the first shutter control signal has a voltage different from a voltage of the second shutter control signal during the first time period and the second time period.

19. The device of claim 18, further comprising:
a second signal processing unit configured to modify the first shutter control signal by adding a third modification voltage to a shutter close period of the first shutter control signal for a third time period beginning at the end point of the first image frame and configured to modify the second shutter control signal by adding the third modification voltage to a shutter close period of the second shutter control signal for the third time period beginning at the end point of the second image frame, the shutter close period of the first shutter control signal and the shutter close period of the second shutter control signal corresponding to a second voltage.

20. The device of claim 19, wherein a polarity of the first modification voltage is the same as a polarity of the second modification voltage, and
wherein a polarity of the second voltage is different from the polarity of the first modification voltage and the polarity of the second modification voltage.

21. The device of claim 20, wherein a magnitude of the first modification voltage has a constant value for the first time period, and a magnitude of the second modification voltage has a constant value for the second time period.

22. The device of claim 20, wherein a magnitude of the third modification voltage has a constant value for the third time period.

23. The device of claim 20, wherein a magnitude of the third modification voltage decreases in a step shape for the third time period.

24. The device of claim 20, wherein a magnitude of the third modification voltage decreases in a curve shape for the third time period.

25. The device of claim 20, wherein a magnitude of the third modification voltage decreases in a straight line shape for the third time period.

* * * * *